US012613007B1

(12) United States Patent
Liggett

(10) Patent No.: US 12,613,007 B1
(45) Date of Patent: Apr. 28, 2026

(54) APPARATUS FOR TRANSFERRING LIQUIFIED GASES BETWEEN CANISTERS

(71) Applicant: Alpenglow Gear LLC, Atherton, CA (US)

(72) Inventor: Thomas Liggett, Atherton, CA (US)

(73) Assignee: Alpenglow Gear LLC, Atherton, CA (US)

( * ) Notice: Subject to any disclaimer, the term of this patent is extended or adjusted under 35 U.S.C. 154(b) by 46 days.

(21) Appl. No.: 19/078,865

(22) Filed: Mar. 13, 2025

(51) Int. Cl.
*F17C 13/00* (2006.01)

(52) U.S. Cl.
CPC ........ *F17C 13/00* (2013.01); *F17C 2221/035* (2013.01); *F17C 2227/041* (2013.01)

(58) Field of Classification Search
CPC ................ F17C 13/00; F17C 2221/035; F17C 2227/041; F17C 13/04; F17C 2270/0709; F17C 2223/033; F17C 2223/0153; F17C 2205/0373; F16L 37/107; F16L 37/113; F16L 37/248; F16L 37/252; F16L 37/26; F16L 37/28; F16L 37/30; F16L 37/32; F16L 37/36; F16L 37/373; F16L 37/40; F16L 37/47; B67D 7/04
USPC ............ 141/311 R; 137/614.04, 233, 614.05
See application file for complete search history.

(56) References Cited

U.S. PATENT DOCUMENTS 2,896,977 A * 7/1959 Hansen ................ F16L 37/107 137/614.04
4,082,112 A * 4/1978 Schmidt ................ F16L 37/32 137/614.04
4,549,576 A * 10/1985 Angel ................ F16L 37/23 137/614.04
4,899,792 A * 2/1990 Podgers ................ B67D 7/42 285/272
8,578,957 B2 * 11/2013 Wolff ................ F16L 55/1007 137/614.04

(Continued)

FOREIGN PATENT DOCUMENTS

WO 2007100930 A2 9/2007

OTHER PUBLICATIONS

Anonymous, "FlipFuel® Fuel Transfer Device", <https://www.flipfuel.co/products/flipfuel-fuel-transfer-device>, retrieved Jun. 2, 2025, 5 pages, FlipFuel.co, Tempe, Arizona, USA.

(Continued)

*Primary Examiner* — Christopher M Afful
(74) *Attorney, Agent, or Firm* — Baker Botts L.L.P.

(57) ABSTRACT

A fluid transfer apparatus may comprise a housing with first and second opposing openings and a plate extending across the housing. The plate has a first surface facing the first opening and a second surface facing the second opening, a first pin coupled to the first surface and extending from the first surface, a second pin coupled to the second surface and extending from the second surface, a channel that allows fluid to pass from the first opening to the second opening, a plurality of first inner ribs, each having a horizontally extending portion along the first surface, a first gasket interposed between the first surface and the first opening, wherein the first gasket comprises a first center gasket opening surrounding the first pin and the plurality of first inner ribs, and a second gasket interposed between the second surface and the second opening.

22 Claims, 26 Drawing Sheets

(56) References Cited

U.S. PATENT DOCUMENTS

| | | | | |
|---|---|---|---|---|
| 2011/0214749 A1* | 9/2011 | Abrams | ............. | F16L 55/1007 137/67 |
| 2017/0268727 A1 | 9/2017 | Owens et al. | | |

OTHER PUBLICATIONS

Anonymous, "Lixada Gas Saver Plus, Gas Convertor Shifter, Refill Flat Tank, Conversion Adapter, Camping Gas Adaptor Valve, for Nozzle Bottle Type/Butane Gas Cartridge/Lindal Valve Canister", <https://www.amazon.com/Lixada-Convertor-Conversion-Cartridge-Canister/dp/B0SH832ZTJ/>, 9 pages, retrieved Jun. 2, 2025, Lixada Inc.

Anonymous, "Butane Fuel Canister Shifter and Propane lsobutane Refill Adapters Set, Camping Backpacking Stove Refill Adapter Valve Kit for 1lb Propane Gas Tank", <https://www.amazon.com/BLLNDX-Canister-Isobutane Adapters-Backpacking/dp/B0BGSSSYV6/>, 6 pages, retrieved Jun. 2, 2025.

Anonymous, "Metal Gas Stove Adapter for Outdoor Hiking, Inflate Butane Canister, Portable Gas Cylinder Burner Accessory", <https://www.amazon.com/Camping-Canister-Portable-Cylinder-Accessories/dp/B0BYQGCZBM>, 6 pages, retrieved Jun. 3, 2025.

Anonymous, "Ciwanning Convert Adapter Butanes Stove Refill Adapter Cartridge Nozzles Screw Type Canister Connector Easy to", <https://www.walmart.com/ip/Ciwanning-Convert-Adapter-Butanes-Stove-Refill-Adapter-Cartridge-Nozzles-Screw-Type-Canister-Connector-Easy-to/16646912871>, 2 pages, retrieved Jun. 3, 2025.

* cited by examiner

APPARATUS FOR TRANSFERRING LIQUIFIED GASES BETWEEN CANISTERS

COPYRIGHT NOTICE

A portion of the disclosure of this patent document contains material that is subject to trademark or copyright protection. The copyright owner has no objection to the facsimile reproduction by anyone of the patent document or the patent disclosure, as it appears in the Patent and Trademark Office patent file or records, but otherwise reserves all trademark and copyright rights. © 2024-2025 Alpenglow Gear LLC.

FIELD OF THE DISCLOSURE

One technical field of the present disclosure is devices and systems for transferring liquified petroleum gases, such as butane, isobutane, and propane, between storage vessels. Another technical field is techniques for controlling and directing the flow of liquified petroleum gases from a first vessel to a second vessel.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Liquified petroleum gases, such as butane, isobutane, and propane, are often packaged, stored, shipped, and sold in camping fuel canisters. The fuel canisters may be connected to and used for cooking on camping stoves. Although the canisters may be manufactured as single-use items, it is a common practice to adjust the quantity of fuel in the canisters. Campers may increase or decrease the quantity of fuel in a canister depending on the planned duration of a camping trip by transferring fuel from a donor can to a receiving can.

Camping fuel canisters are typically built in conformance with European Standard EN417 and may include a 7⁄16-inch Unified Thread Standard Extra Fine (UNEF) threaded Lindal B187 valve. Fuel may be transferred from one canister to another by attaching a transfer valve between the two canisters. However, transfer valves often have moving components that can be damaged or blocked by debris. Debris can originate during a milling process used to manufacture transfer valves or may be introduced from an environment in which transfer valves are used. Additionally, transfer valves and canister valves may become cross-threaded. Weight is also a key concern for camping equipment, and transfer valves may be relatively heavy.

Based on the foregoing, the referenced technical fields have developed an acute need for a lightweight fuel transfer apparatus that may be easier to clear debris from and less likely to cause cross-threading problems.

SUMMARY

The appended claims may serve as a summary of the invention.

DETAILED DESCRIPTION

1. General Overview

Figure 1A:
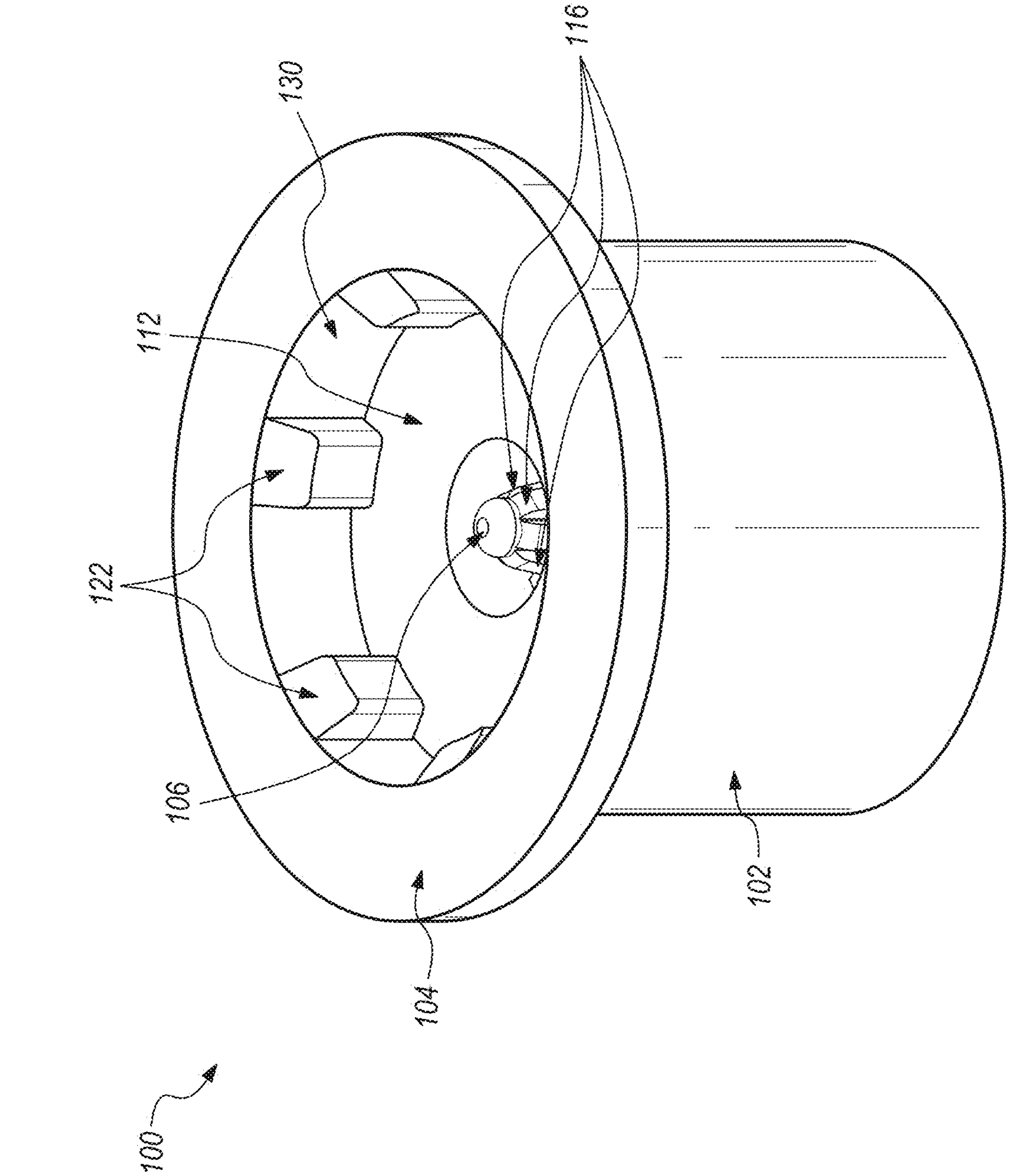
FIG. 1A illustrates a perspective view of a liquified gas transfer apparatus of one example embodiment.

The details of one or more embodiments of the subject matter described in this specification are outlined in the accompanying drawings and the description below. Other potential features, aspects, and advantages of the subject matter will become apparent from the description, the drawings, and the claims. In the following description, details are set forth by way of example to facilitate discussion of the disclosed subject matter. However, it should be apparent that the disclosed embodiments are exemplary and only exhaustive of some possible embodiments.

In the following description, some components and elements of the subject matter are described as "horizontal" or "vertical" relative to an upright view of the drawing figures in "landscape" orientation. These terms are used to provide an example frame of reference based on an orientation of the described invention within a system in which it may be used. In some embodiments, the described components or elements may not be precisely parallel to vertical or horizontal axes. The described components and elements may have, in an embodiment, a 2° draft angle. The draft angle may improve manufacturing processes, for example, by reducing the difficulty of removing injection-molded plastic components from a mold.

Embodiments encompass the subject matter of the following numbered clauses:

1. An apparatus for transferring fluids, the apparatus comprising: a housing having first and second opposing openings; a plate extending across the housing, wherein the plate has a first plate surface facing the first opening and a second plate surface facing the second opening; a first pin coupled to the first plate surface and extending from the first plate surface towards the first opening; a second pin coupled to the second plate surface and extending from the second plate surface towards the second opening; a channel through the plate configured to allow a fluid to pass from the first opening to the second opening; and a first gasket interposed between the first plate surface and the first opening, wherein the first gasket comprises a first gasket opening surrounding the first pin.
2. The apparatus of clause 1, wherein the housing is cylindrical and extends along a center axis, wherein the plate comprises a horizontal disk in a plane perpendicular to the center axis, and wherein the first and second pins extend along the center axis.
3. The apparatus of clause 2, wherein the first opening has a first diameter that is larger than the major diameter of a Lindal B188 valve thread.
4. The apparatus of clause 1, wherein the first pin is configured to depress a plunger of a valve on a canister, wherein depressing the plunger allows the fluid to flow from the canister through the first opening and through the channel.
5. The apparatus of clause 4, further comprising a plurality of inner ribs, each having a horizontally extending portion along the first plate surface, wherein the horizontally extending portion of each of the plurality of inner ribs is configured to limit a depth of insertion of the valve of the canister into the housing.
6. The apparatus of clause 1, further comprising a plurality of outer ribs coupled to the housing, each of the plurality of outer ribs having a first end facing the first opening and a second end facing the plate, wherein the first end comprises an inclined surface configured to direct and center a valve inserted into the housing.
7. The apparatus of clause 1, further comprising a removable ring configured to hold the first gasket in place.
8. The apparatus of clause 1, wherein the channel is one channel of a plurality of channels distributed radially around the first and second pins.
9. An apparatus for transferring fluids, the apparatus comprising: a housing having first and second opposing openings; a plate extending across the housing, wherein the plate has a first plate surface facing the first opening and a second plate surface facing the second opening; a first pin coupled to the first plate surface and extending from the first plate surface towards the first opening; a second pin coupled to the second plate surface and extending from the second plate surface towards the second opening; a channel through the plate configured to allow the fluid to pass from the first opening to the second opening; a first gasket interposed between the first plate surface and the first opening; and a second gasket interposed between the second plate surface and the second opening.
10. The apparatus of clause 9, wherein the housing is cylindrical and extends along a center axis, wherein the plate comprises a horizontal disk in a plane perpendicular to the center axis, and wherein the first and second pins extend along the center axis.
11. The apparatus of clause 10, wherein the first opening has a first diameter that is larger than the major diameter of a Lindal B188 valve thread.
12. The apparatus of clause 9, wherein the first pin is configured to depress a plunger of a valve on a canister, wherein depressing the plunger allows the fluid to flow from the canister through the first opening and through the channel.
13. The apparatus of clause 12, further comprising a removable ring configured to hold the first gasket in place, the removable ring having a first end facing the first opening and a second end facing the plate, wherein the first end comprises an inclined surface configured to direct and center a valve inserted into the housing.
14. The apparatus of clause 13, wherein the second end comprises a surface parallel to the plate and wherein the second end is configured to hold the first gasket in place.
15. The apparatus of clause 9, wherein the channel is one channel of a plurality of channels distributed radially around the first and second pins.
16. An apparatus for transferring fluids, comprising: a housing having first and second opposing openings; a plate extending across the housing, wherein the plate has a first plate surface facing the first opening and a second plate surface facing the second opening; a first pin coupled to the first plate surface and extending from the first plate surface towards the first opening; a second pin coupled to the second plate surface and extending from the second plate surface towards the second opening; a channel through the plate configured to allow a fluid to pass from the first opening to the second opening; a removable ring having a first end facing the first opening and a second end facing the plate; and a first gasket interposed between the first plate surface and the first opening, wherein the first gasket comprises a first center gasket opening surrounding the first pin.
17. The apparatus of clause 16, wherein the housing is cylindrical and extends along a center axis, wherein the plate comprises a horizontal disk in a plane perpendicular to the center axis, and wherein the first and second pins extend along the center axis.
18. The apparatus of clause 16, wherein the first opening has a first diameter that is larger than the major diameter of a Lindal B188 valve thread.
19. The apparatus of clause 19, wherein the first pin is configured to depress a plunger of a valve on a canister, wherein depressing the plunger allows the fluid to flow from the canister through the first opening and through the channel.

20. The apparatus of clause 16, wherein the first end comprises an inclined surface configured to direct and center a valve inserted into the housing.

21. The apparatus of clause 20, wherein the second end comprises a surface parallel to the plate and wherein the second end is configured to hold the first gasket in place.

22. The apparatus of clause 16, wherein the channel is one channel of a plurality of channels distributed radially around the first and second pins.

2. Example Embodiments of Apparatus

In embodiments, an apparatus for transferring fluid is compatible with fluid storage containers and structured to allow fluids such as liquified petroleum fuels to be transferred from one such container to another. The device may be lightweight and easy to clear of debris, facilitating use in outdoor environments. Example environments include, but are not limited to, camping or hiking.

In an embodiment, a fluid transfer apparatus may be coupled between two containers that are compatible with the apparatus. In some situations, the apparatus and the containers are independently manufactured, offered, or sold by different entities. Thus, while the apparatus and the containers are compatible in the manner further described herein for the apparatus, the containers can be made or supplied independently from the apparatus. The containers may be pressurized canisters, vessels, or other containers for holding or storing liquefied petroleum gases, such as butane, isobutane, and propane under pressure. Each container may have a valve with a plunger that may be depressed to release the stored liquified petroleum gases. The fluid transfer apparatus may have two pins facing in opposite directions from each other, and when force is applied to the pins of a magnitude sufficient to overcome gravity or resistance arising from the pressure of the gas, each pin may depress a plunger of a canister when the canisters are coupled to the fluid transfer apparatus. The two pins may be arranged on opposite sides of a center plate. The center plate may comprise a plurality of holes through which liquified petroleum gas may be directed, for example, due to gravitational force or to a pressure differential, from one canister to another canister. Each pin may be surrounded by a chemically resistant gasket that may prevent transferred liquified petroleum gas from leaking out of the fluid transfer apparatus.

FIG. 1A illustrates a perspective view of a fluid transfer apparatus in one embodiment. In the example of FIG. 1A, a fluid transfer apparatus 100 has a housing 102. In an embodiment, the housing may be a tubular hollow cylinder. In other embodiments, the housing may be other shapes, such as a polygonal prism. The housing may have an upper opening 130. The housing may also have a lower opening 140, shown first in FIG. 3B. In an embodiment, the upper opening 130 and the lower opening 140 each may be circular. In an embodiment, the upper opening 130 and the lower opening 140 may each have an opening diameter larger than that of an outer diameter of a B188 Lindal valve or a major diameter of threads of a B188 Lindal valve.

In an embodiment, a horizontal ring 104 may surround the upper opening 130 and is formed or molded integrally with housing 102. The horizontal ring 104 may provide a surface against which a user may apply pressure. In embodiments, a canister may be coupled to lower opening 140, and pressure may be applied to fluid transfer apparatus 100 to open a valve of the canister. This allows a user to empty the canister into the surrounding environment while minimizing contact with the expanding gas. In another embodiment, horizontal ring 104 may be excluded. In another embodiment, housing 102 may have a horizontal ring surrounding each of the upper opening 130 and the lower opening 140.

In an embodiment, the fluid transfer apparatus 100 may include an upper pin 106. Upper pin 106 may depress the plunger of a canister. The fluid transfer apparatus may also include a lower pin 108, shown first in FIG. 3C. The upper pin 106 and the lower pin 108 may each have a rounded or chamfered end. The rounded or chamfered ends may assist with directing and centering fluid transfer apparatus with a canister valve opening. The upper pin 106 and the lower pin 108 may each have a pin diameter smaller than an opening in a canister valve. In an embodiment, the pin diameter may be 1.8 millimeters (about 0.07087 inches). In another embodiment, the pin diameter may be between 1.6 and 2.0 millimeters (between about 0.06299 and 0.07874 inches), less than 1.6 millimeters (about 0.06299 inches), or more than 2.0 millimeters (about 0.07874 inches).

In an embodiment, the fluid transfer apparatus 100 may include an upper gasket 112. The upper gasket 112 may comprise a gasket opening. The upper pin 106 may extend through the gasket opening so that the upper pin 106 is surrounded by the upper gasket 112. The fluid transfer apparatus may also have a lower gasket 114, first shown in FIG. 4B. The lower gasket may comprise a gasket opening. The lower pin 108 extends through the gasket opening so that the lower pin 108 is surrounded by the lower gasket 114.

Upper gasket 112 and lower gasket 114 may each comprise a chemically resistant nitrile rubber. In another embodiment, upper gasket 112 and lower gasket 114 may each comprise a material such as silicone, fluorosilicone, rubber, fluoro-rubber, Polytetrafluoroethylene (PTFE), neoprene, or polyvinyl chloride (PVC). In an embodiment, upper gasket 112 and lower gasket 114 may each comprise a closed-cell foam or a closed-cell rubber. In an embodiment, upper gasket 112 and lower gasket 114 may each be 0.125 inches thick (about 3.175 millimeters). In another embodiment, upper gasket 112 and lower gasket 114 may each have a thickness of less than 0.125 inches or more than 0.125 inches.

Figure 3A:
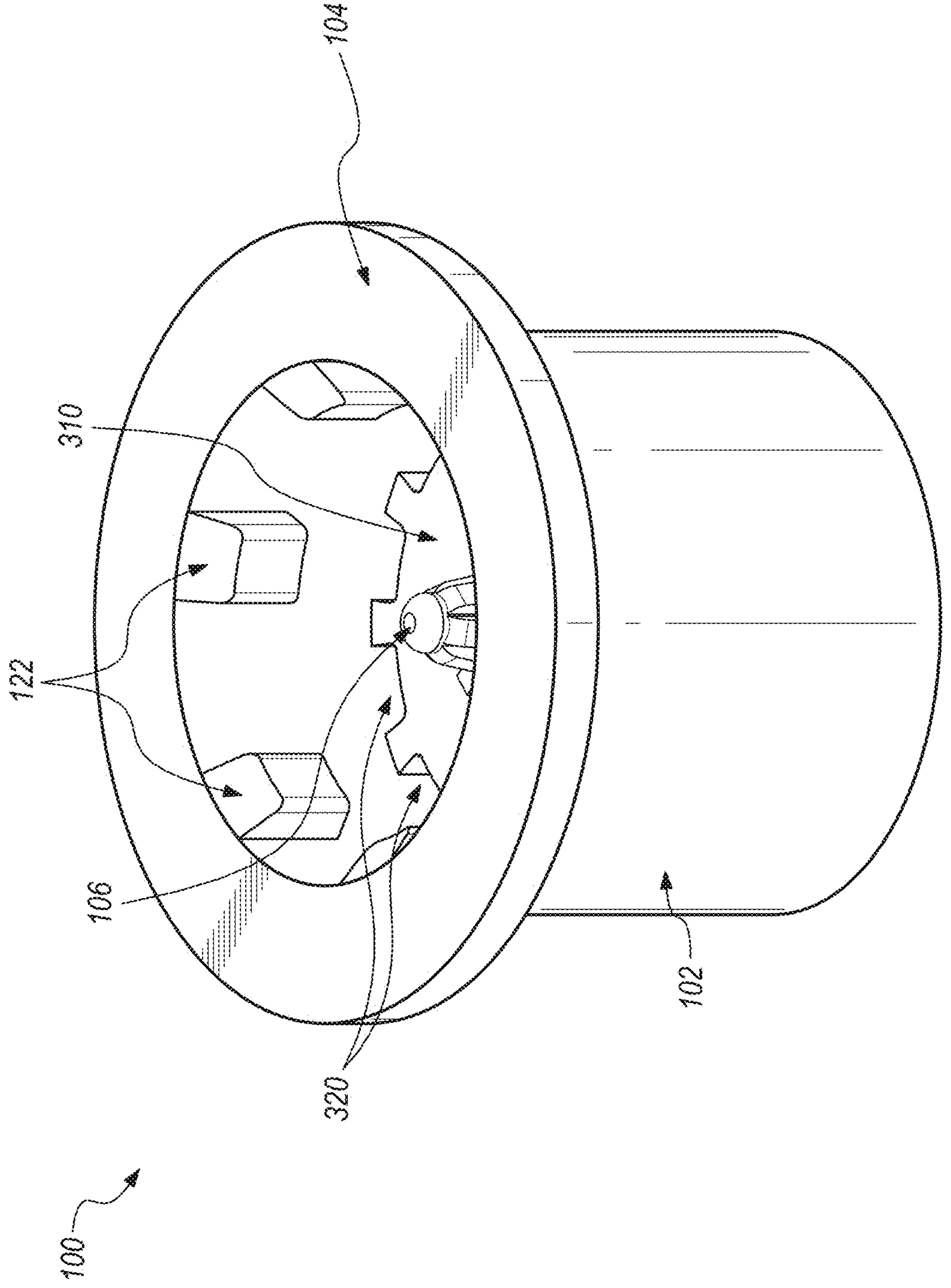
FIG. 3A illustrates a perspective view of a liquified gas transfer apparatus of one example embodiment.

In an embodiment, the upper pin 106 and the lower pin 108 may each extend from a center plate 310, first shown in FIG. 3A. The upper pin 106, the lower pin 108, and the center plate 310 may formed or molded integrally with housing 102. In an embodiment, each of the upper pin 106 and the lower pin 108 may have a height that is selected based on the hardness or elasticity modulus of a material used for upper gasket 112 and lower gasket 114. A softer material or a material with a higher elasticity modulus may require more compression before forming a seal for fluid transfer. To allow for greater compression, a shorter pin height may be used. In an embodiment, the upper pin 106 and the lower pin 108 may each extend 3.7 millimeters (about 0.145669 inches) in height from center plate 310. In another embodiment, each pin may have a height between 3.7 and 3.8 millimeters (between about 0.145669 and 0.149606 inches), less than 3.7 millimeters (about 0.149606 inches), or more than 3.8 millimeters (about 0.149606 inches).

In an embodiment, the fluid transfer apparatus 100 may include a plurality of upper outer ribs 122 formed integrally with and extending inwardly from housing 102 and above the upper gasket 112. The plurality of upper outer ribs 122 may be distributed around a perimeter of the upper opening 130 inside housing 102. The fluid transfer apparatus 100 may also include a plurality of lower outer ribs 124, first shown in FIG. 3B. The plurality of lower outer ribs 122 may be distributed around a perimeter of the lower opening 140 inside housing 102. In an embodiment, the plurality of upper outer ribs 122 and the plurality of lower outer ribs 124 may hold upper gasket 112 and lower gasket 114, respectively, within housing 102. In an embodiment, the plurality of upper outer ribs 122 and the plurality of lower outer ribs 124 may direct and center canister valves inserted into the upper opening 130 and the lower opening 140.

Figure 1B:
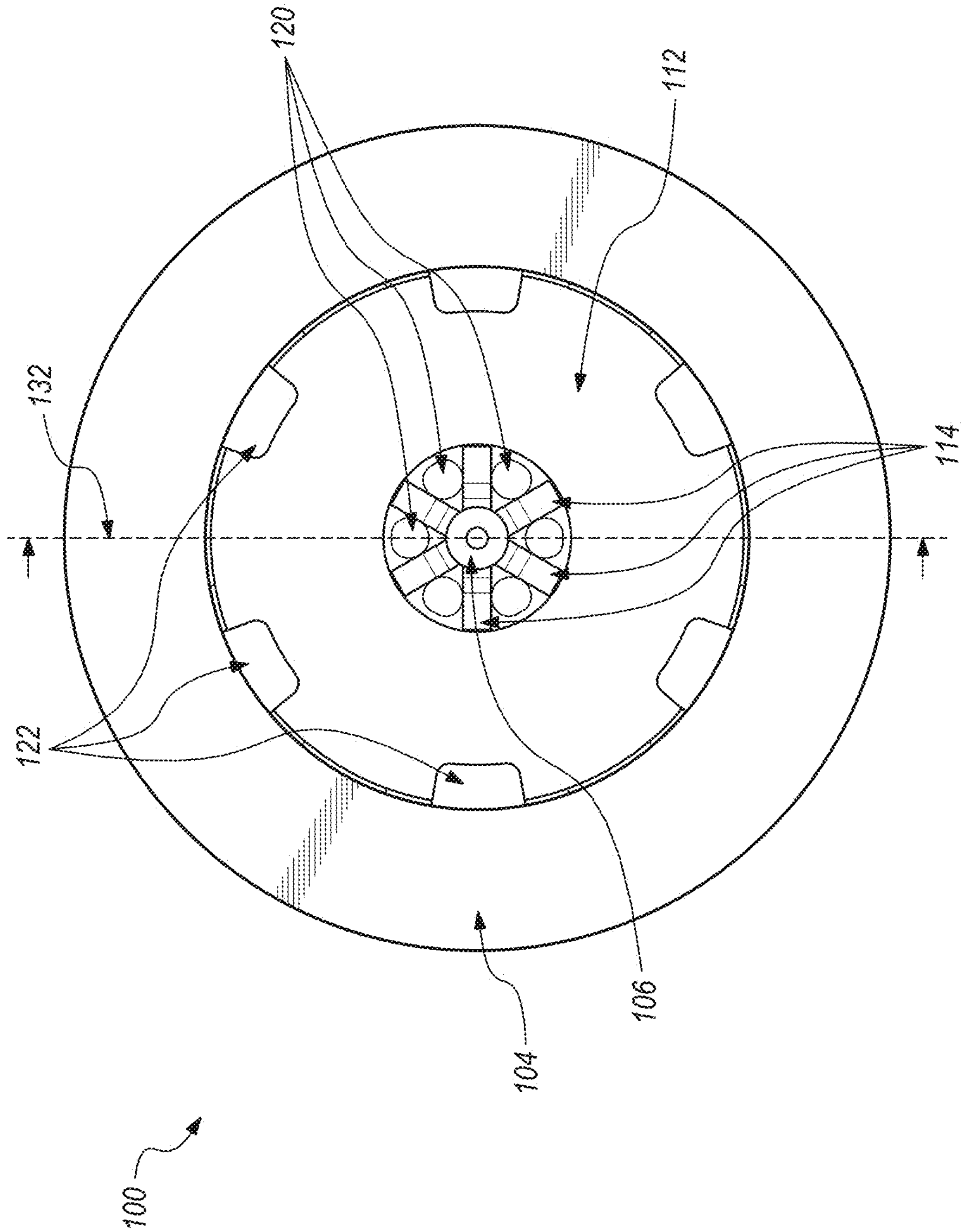
FIG. 1B illustrates a top plan view of a liquified gas transfer apparatus of one example embodiment.

FIG. 1B illustrates a top plan view of a liquified gas transfer apparatus of one example embodiment. In the example of FIG. 1B, the fluid transfer apparatus 100 comprises a plurality of holes 120 surrounding the upper pin 106. The plurality of holes 120 may extend entirely through a center plate 310 to form passages through the center plate 310. The plurality of holes 120 may provide channels so that liquified petroleum gases may be directed through the fluid transfer apparatus 100.

In an embodiment, a plurality of upper inner ribs 116 may extend from upper pin 106. In an embodiment, upper inner ribs 116 may extend radially from upper pin 106, and a hole from the plurality of holes 120 may be interposed between each pair of adjacent upper inner ribs 116. A plurality of lower inner ribs 118, first shown in FIG. 3C may also extend from lower pin 108. In an embodiment, lower inner ribs 118 may extend radially from lower pin 108, and a hole from the plurality of holes 120 may be interposed between each pair of adjacent upper inner ribs 116.

In an embodiment, each hole in the plurality of holes may be circular. In other embodiments, the holes may have other shapes, such as a triangle or a sector of a circle centered on upper pin 106. For example, each hole in the plurality of holes may extend over the area from upper pin 106 to an inner edge of upper gasket 112 between two adjacent upper inner ribs 116 to increase the total cross-sectional area of the channels and increase the flow rate through the fluid transfer apparatus.

In an embodiment, each of the plurality of upper outer ribs 122 may be diametrically opposite another of the plurality of upper outer ribs 122. Each of the plurality of lower outer ribs 124 may also be diametrically opposite another of the plurality of lower outer ribs 124. The distance between the opposing upper outer ribs or the opposing inner outer ribs may be larger than the diameter of a B188 Lindal valve or a major diameter of threads of a B188 Lindal valve. In an embodiment, the distance between opposing upper outer ribs 122 or the distance between opposing lower outer ribs 124 can be 11 millimeters (about 0.433071 inches). In other embodiments, the opening diameter may be between 10.5 and 11.5 millimeters (between about 0.41339 and 0.45276 inches), smaller than 10.5 millimeters (about 0.41339 inches), or larger than 11.5 millimeters (about 0.45276 inches).

In the example of FIG. 1B, a section view diameter line 132 extends across the fluid transfer apparatus 100. The section view diameter line 132 may represent a plane along which a cross-section of the fluid transfer apparatus may be viewed. In an embodiment, the section view diameter line 132 extends through two holes in the plurality of holes 120, the center plate 310, the upper pin 106, the lower pin 108, the upper gasket 112 and lower gasket 114 and two of the lower outer ribs 122, shown in FIG. 4B.

Figure 2A:
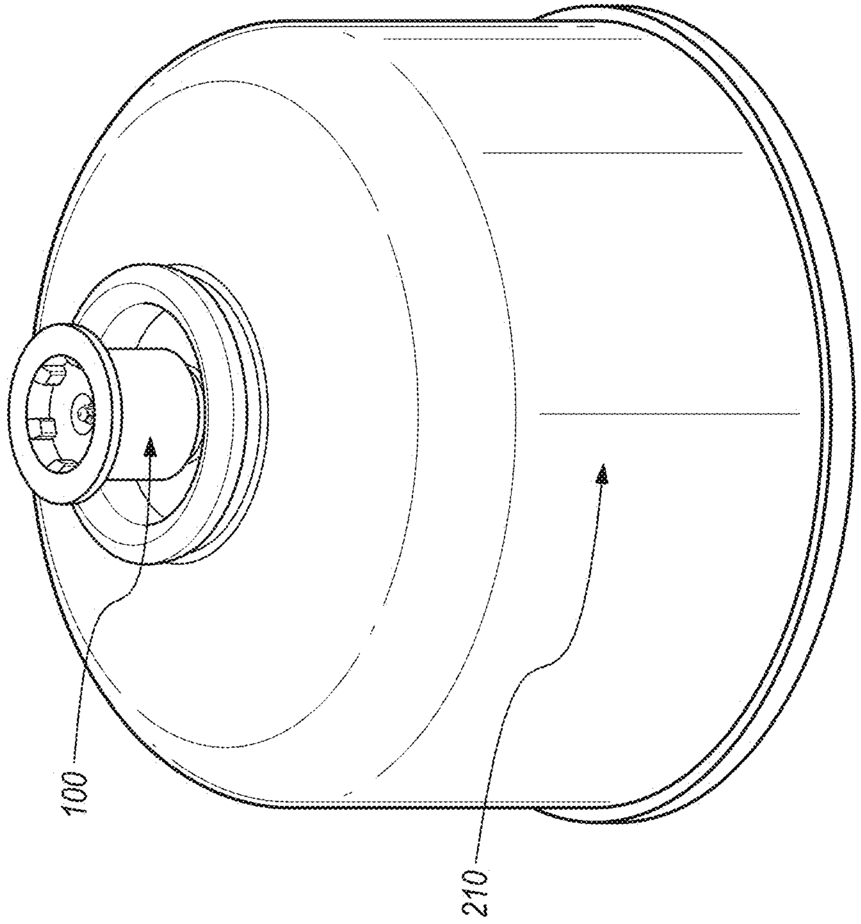
FIG. 2A illustrates a perspective view of a system in which a liquified gas transfer apparatus may be used in one example embodiment.

FIG. 2A illustrates a perspective view of a system in which a liquified gas transfer apparatus may be used in one example embodiment. In this context, 'system' can refer to a combination of a first vessel, an optional second vessel, and a fluid transfer device (or apparatus). In the example of FIG. 2A, a valve of a lower canister 210 has been inserted into the lower opening 140 of the fluid transfer apparatus 100. In an embodiment, a single canister such as lower canister 210 may be attached to the fluid transfer apparatus 100 for discharging the contents of lower canister 210 into the atmosphere.

Figure 2B:
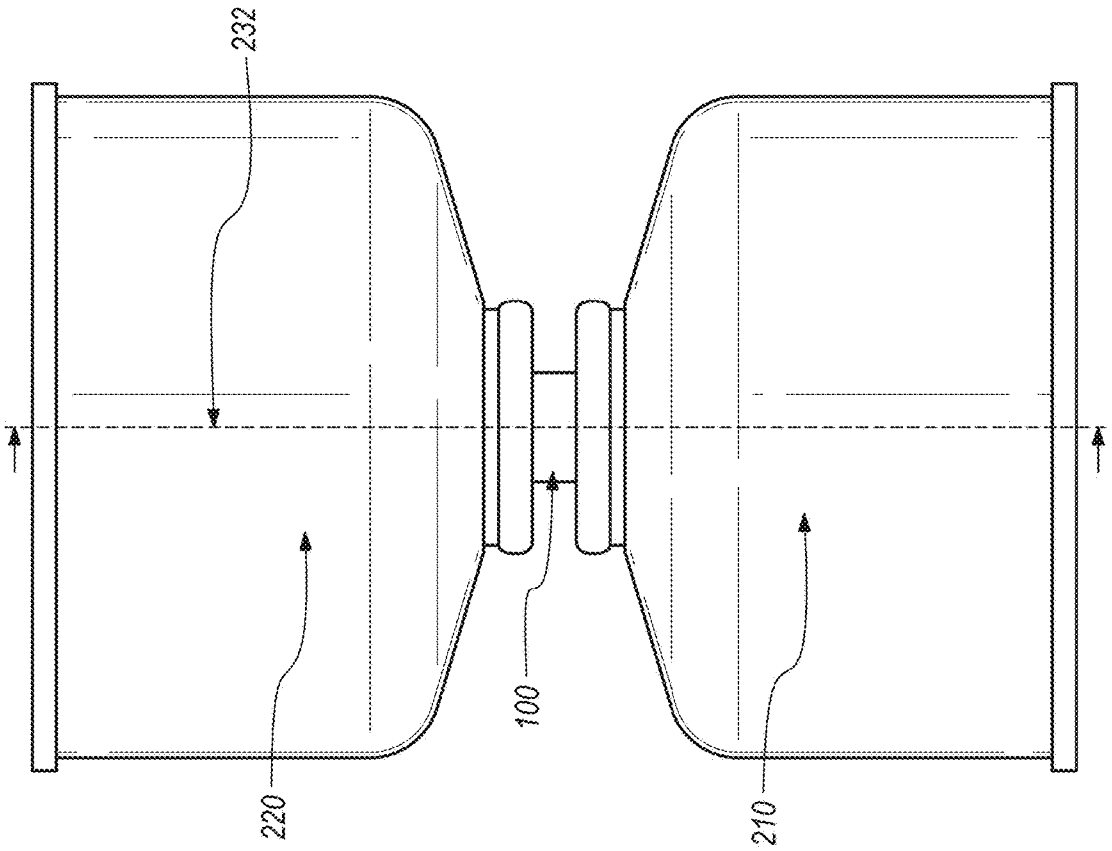
FIG. 2B illustrates a side elevation view of a system in which a liquified gas transfer apparatus may be used in one example embodiment.

FIG. 2B illustrates a side elevation view of a system in which a liquified gas transfer apparatus may be used in one embodiment. In the example of FIG. 2A, a valve of the lower canister 210 has been inserted into the lower opening 140 of the fluid transfer apparatus 100, and a valve of the upper canister 220 has been inserted into the upper opening 130 of the fluid transfer apparatus 100. In an embodiment, the upper canister 220 and the lower canister 210 may each store liquefied petroleum gas, such as butane, isobutane, propane, a mixture of those, other fuels, or other liquids or liquefied gases. When force is applied to push the upper canister 220, and the lower canister 210 together towards the fluid transfer apparatus 100, the fluid transfer apparatus 100 may open the valves of the upper canister 220 and the lower canister 210 to direct a fluid stored in the upper canister 220 and the lower canister 210 from one canister to another canister through the plurality of holes 120, for example, due to gravitational force or to a pressure differential between canisters.

In the example of FIG. 2B, a section view diameter line 232 extends across the fluid transfer apparatus 100, the upper canister 220, and the lower canister 210. The section view diameter line 232 may represent a plane along which a cross-section of the fluid transfer apparatus may be viewed.

Figure 3B:
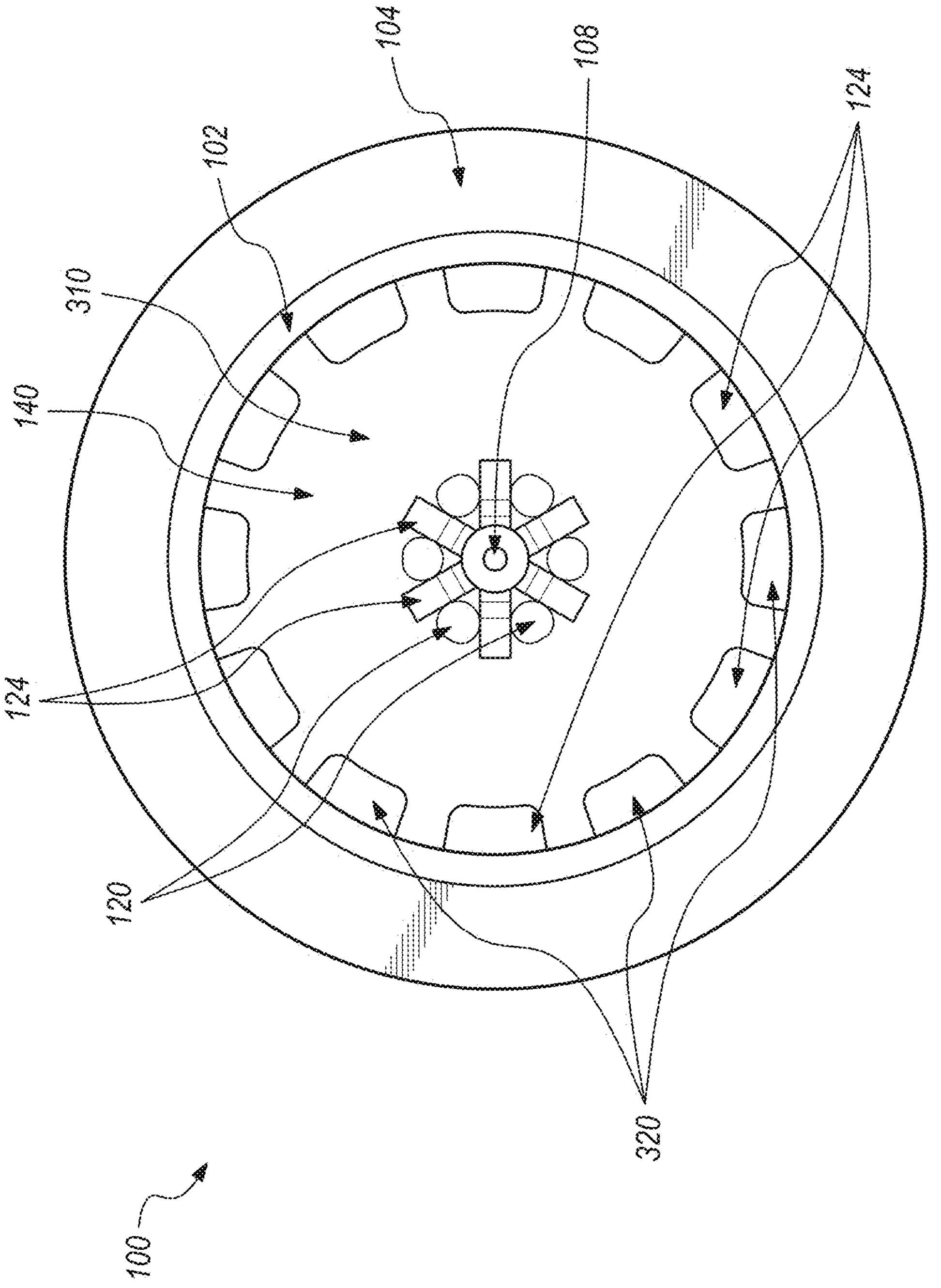
FIG. 3B illustrates a bottom plan view of a liquified gas transfer apparatus of one example embodiment.
Figure 3C:
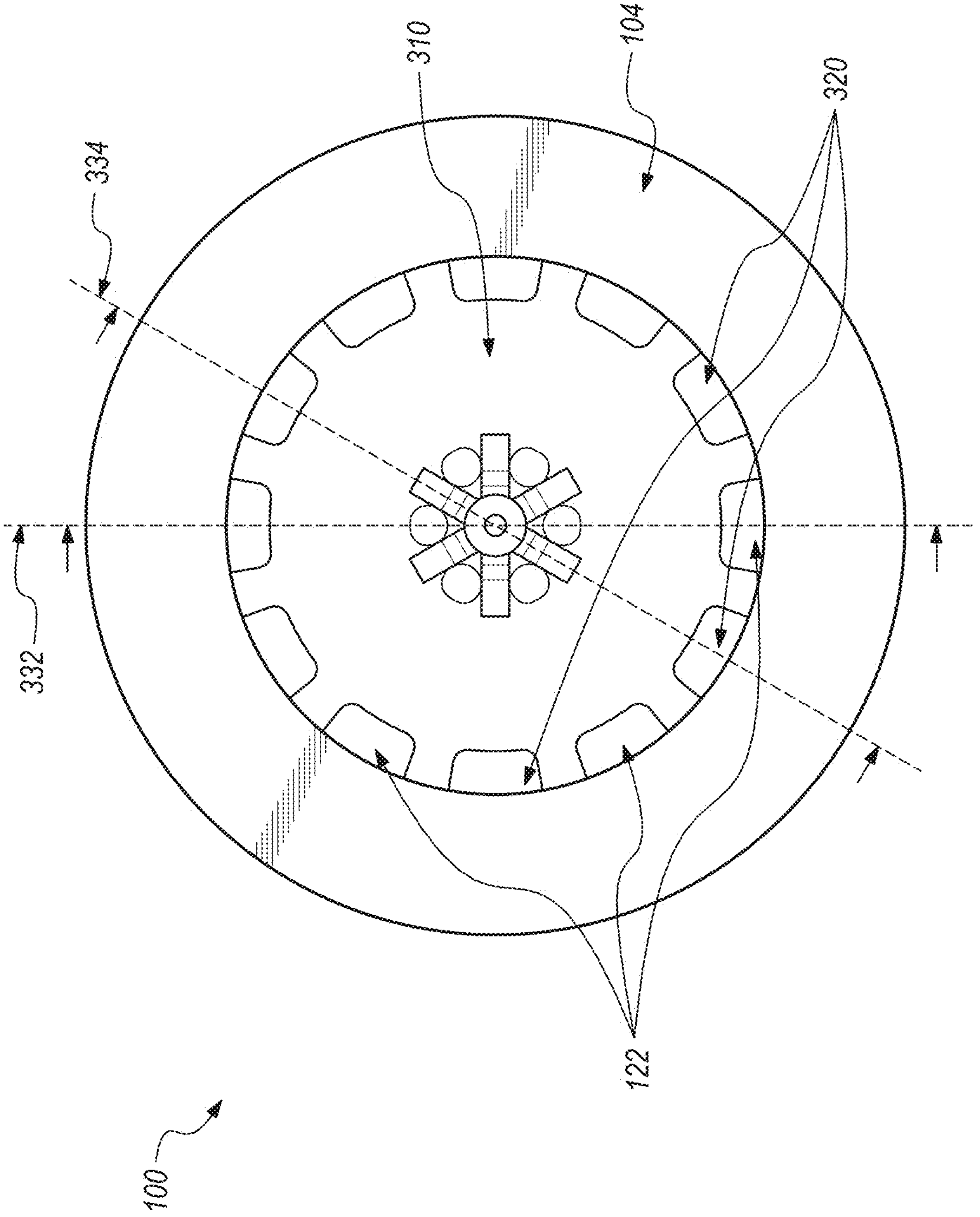
FIG. 3C illustrates a top plan view of a liquified gas transfer apparatus of one example embodiment.

FIG. 3A illustrates a perspective view of a liquified gas transfer apparatus in one embodiment. In the examples of FIG. 3A, FIG. 3B, and FIG. 3C, the upper gasket 112 and the lower gasket 114 are omitted. In an embodiment, the center plate 310 may extend across a cross-section of fluid transfer apparatus 100 and may support the upper pin 106, the lower pin 108, the upper inner ribs 116, and the lower inner ribs 118. The plurality of holes 120 may provide channels through the center plate 310.

In an embodiment, a set of perimeter holes 320 may extend through the center plate 310. The perimeter holes 320 may reduce the weight of the fluid transfer apparatus 100. The perimeter holes 320 may also reduce mold complexity when manufacturing the fluid transfer apparatus 100. In other embodiments, the perimeter holes 320 may be excluded. In an embodiment, many components of the fluid transfer apparatus 100 may be formed together as a single integral part. In an embodiment, the housing 102, the horizontal ring 104, the upper pin 106, the lower pin 108, the center plate 310, the upper outer ribs 122, the lower outer ribs 124, the upper inner ribs 116, and the lower inner ribs 118 may all be integrally formed, for example, from injection molded plastic, such as nylon, or metal. The injection molded plastic may also comprise additives for rigidity, such as glass fibers. In other embodiments, the components may be manufactured separately and then coupled together.

FIG. 3B illustrates a bottom plan view of a liquified gas transfer apparatus in one embodiment. In the example of FIG. 3B, the lower pin 108 and the lower inner ribs 118 extend from the center plate 310. The perimeter holes 320 extend around the edge of the center plate 310, where the center plate 310 is coupled to the housing 102. In an embodiment, every second perimeter hole of the perimeter holes 320 may be overlapped by a corresponding outer rib of the lower outer ribs 124, from a bottom-view perspective.

FIG. 3C illustrates a top plan view of a liquified gas transfer apparatus in one embodiment. In an embodiment, every second perimeter hole of the perimeter holes 320 may be overlapped by a corresponding outer rib of the upper outer ribs 122, from a top-view perspective. In an embodiment, each of the perimeter holes may be overlapped by either an outer rib in the upper outer ribs 122 or an outer rib of the lower outer ribs 124.

In the example of FIG. 3C, a first diameter line 332 and a second diameter line 334 extend across the fluid transfer apparatus 100. The first diameter line 332 and the second diameter line 334 may each represent respective planes along which a cross-section of the fluid transfer apparatus may be viewed. In an embodiment, the first diameter line 332 extends through two holes of the plurality of holes 120, the center plate 310, the upper pin 106, the lower pin 108, two of the perimeter holes 320, and two of the lower outer ribs 124. In an embodiment, the second diameter line 334 extends through two of each of the upper inner ribs 116 and the lower inner ribs 118, the center plate 310, the upper pin 106, the lower pin 108, two of the perimeter holes 320, and two of the upper outer ribs 122.

Figure 4A:
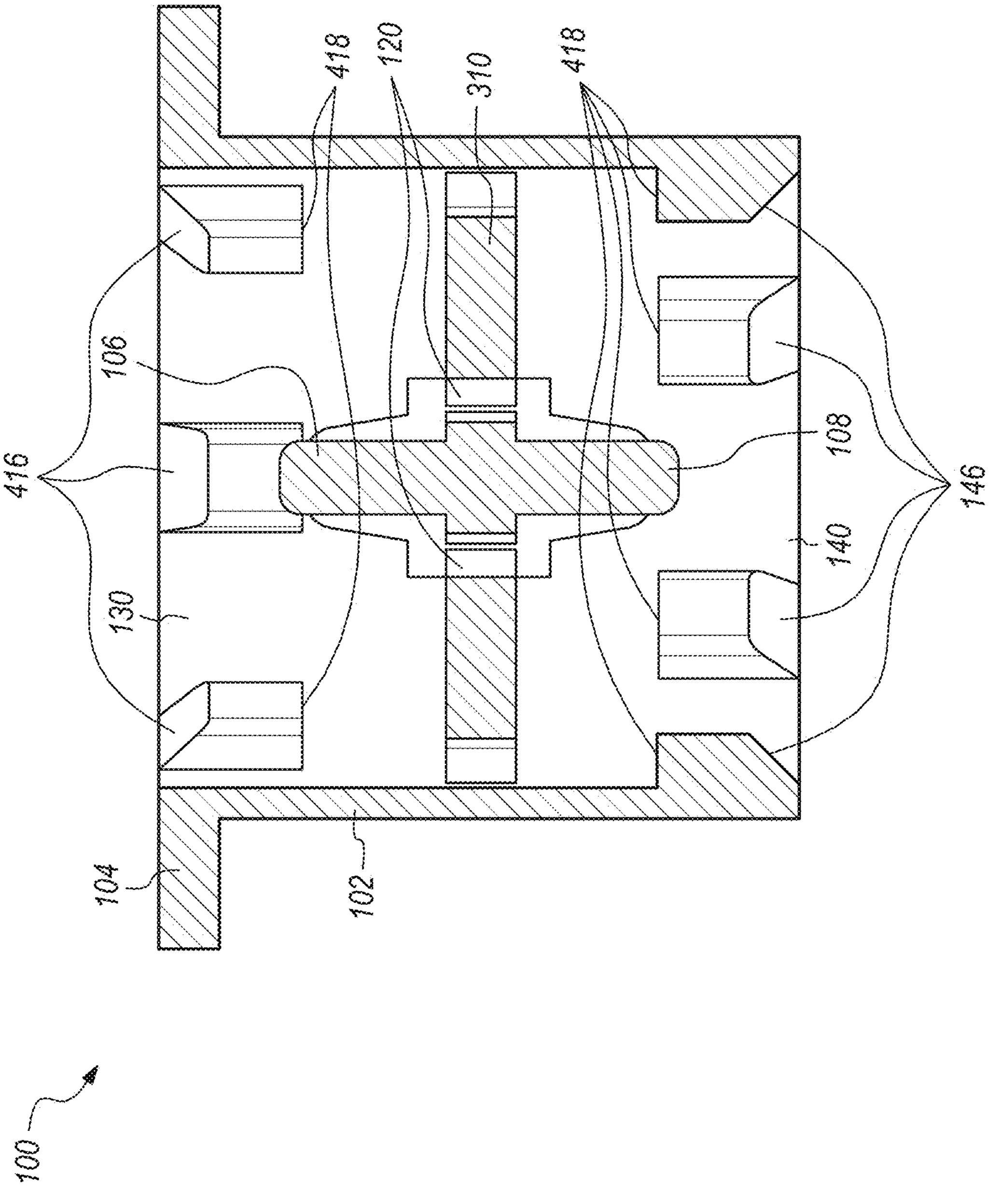
FIG. 4A illustrates a section view taken along line 332 of FIG. 3C.

FIG. 4A illustrates a section view taken along line 332 of FIG. 3C. In the example of FIG. 4A, the upper gasket 112 and the lower gasket 114 are omitted. In an embodiment, each of the upper inner ribs 116 and each of the lower inner ribs may have an inner guide portion 412. The inner guide portion 412 of each of the inner ribs may extend vertically along the upper pin 106 or the lower pin 108. Each inner guide portion 412 has a thickness that increases closer to the center plate 310. The inner guide portions 412 may be used to guide and direct canisters as the canisters are coupled to the fluid transfer apparatus 100. In an embodiment, the inner guide portions 412 may guide canisters such as the lower canister 210 and the upper canister 220 from the inside of valves of the canisters to center the canisters are they are inserted into the upper opening 130 and the lower opening 140 of the fluid transfer apparatus 100.

In an embodiment, each of the upper inner ribs 116 and each of the lower inner ribs 118 may have a limiter portion 414. Each of the limiter portions 414 may extend radially along the center plate 310. In an embodiment, the limiter portions 414 may provide a depth stop for canisters as they are inserted into the upper opening 130 and the lower opening 140 of the fluid transfer apparatus 100. In an embodiment, the limiter portions 414 may also prevent upper gasket 112 and lower gasket 114 from occluding passages through the plurality of holes 120 when gaskets are compressed while in use.

In an embodiment, each of the upper outer ribs 122 and the lower outer ribs 124 may have an outer guide portion 416. The outer guide portions 416 may be inwardly downwardly angled or inclined, for example, at a 450 angle. In other embodiments, outer guide portions 416 may be inclined at an angle between 30° and 60°, less than 30°, or greater than 60°. In an embodiment, the outer guide portions 416 of the outer ribs 122 and 124 may guide canisters such as the lower canister 210 and the upper canister 220 from the outside of valves of the canisters to center the canisters as they are inserted into the upper opening 130 and the lower opening 140 of the fluid transfer apparatus 100.

In an embodiment, each of the upper outer ribs 122 and the lower outer ribs 124 may have a hook portion 418. Each hook portion 418 may be a horizontal planar surface of each of the upper outer ribs 122 and the lower outer ribs 124 that faces the center plate 310. The hook portions 418 may hold the upper gasket 112 and the lower gasket 114 in place against the center plate 310 in the fluid transfer apparatus 100.

In other embodiments, the upper outer ribs 122 and the lower outer ribs 124 or the hook portions 418 may be omitted and other means can be used to hold the upper gasket 112 and the lower gasket 114 in place. In other embodiments, the upper gasket 112 and the lower gasket 114 may be coupled to the fluid transfer apparatus 100 with adhesive or with coupling elements such as screws. In other embodiments, the upper gasket 112 and the lower gasket 114 may be over-molded onto the fluid transfer apparatus 100.

Figure 4B:
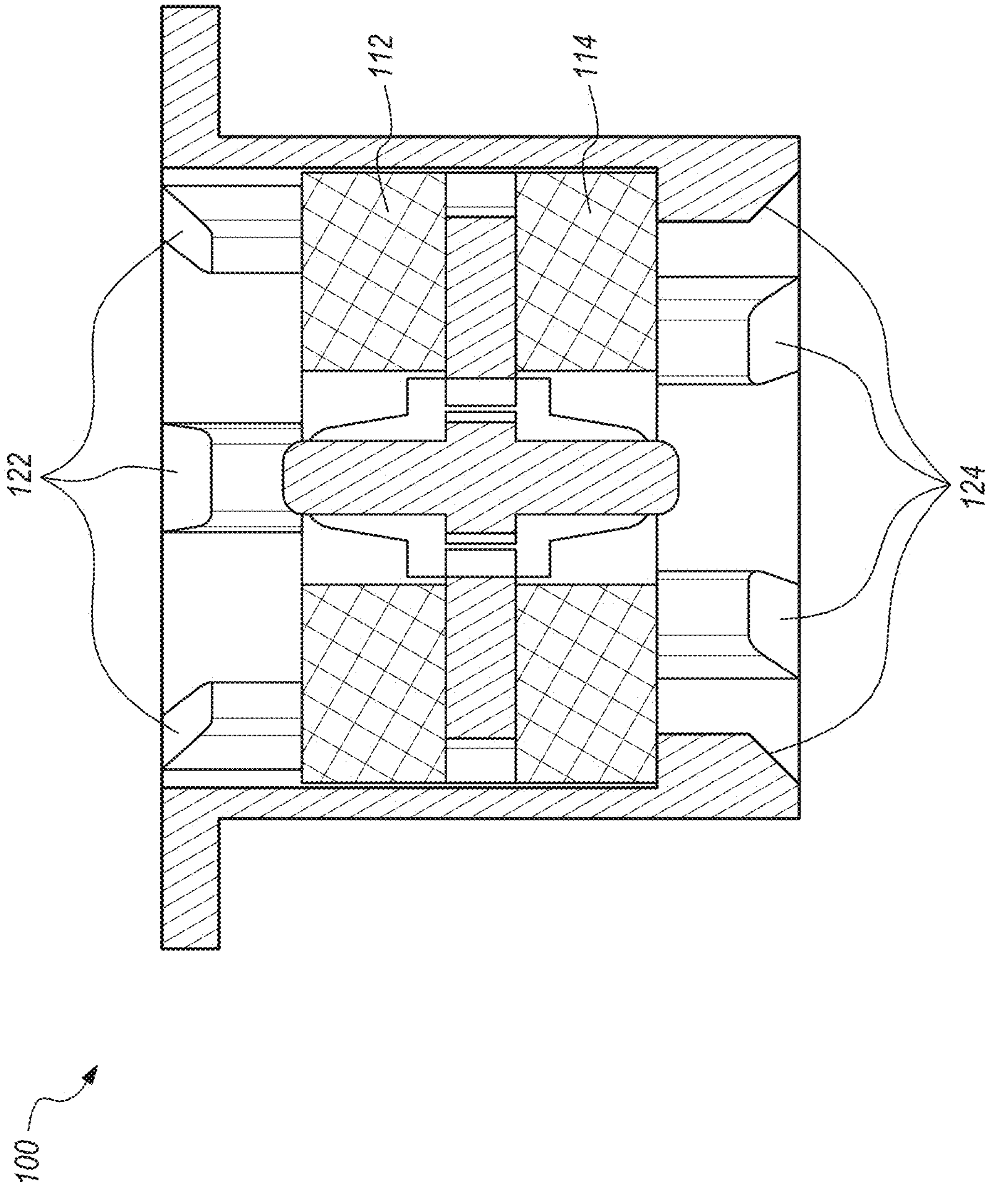
FIG. 4B illustrates a section view taken along line 132 of FIG. 1B.

FIG. 4B illustrates a section view taken along line 132 of FIG. 1B. Line 132 extends in the same direction as line 332 of FIG. 3C, but line 132 is used to denote section views that include upper gasket 112 and lower gasket 114. In the example of FIG. 4B, upper gasket 112 and lower gasket 114 are held in place between the center plate 310 and the hook portions 418.

In an embodiment, the upper gasket 112 and the lower gasket 114 may each be cylindrical, with a circular opening through the center axis of the gasket. The circular openings through the upper gasket 112 and lower gasket 114 may overlap each other and the plurality of holes 120. When fluid passes through the fluid transfer apparatus 100, the upper gasket 112 and lower gasket 114 may prevent fluid from leaking into the outside environment as the fluid flows or is directed from a canister coupled to the upper opening 130 to another canister coupled to the lower opening 140. In other embodiments, the upper gasket 112 and the lower gasket 114 may each be toroidal; for example, the upper gasket 112 and the lower gasket 114 may be O-rings. In an embodiment, the upper gasket 112 and the lower gasket 114 may each be compressible. In an embodiment, the upper gasket 112 and the lower gasket 114 may each conform to the shape of the fluid transfer apparatus 100 and/or to the shape of canister valves coupled to the fluid transfer apparatus 100.

Figure 5A:
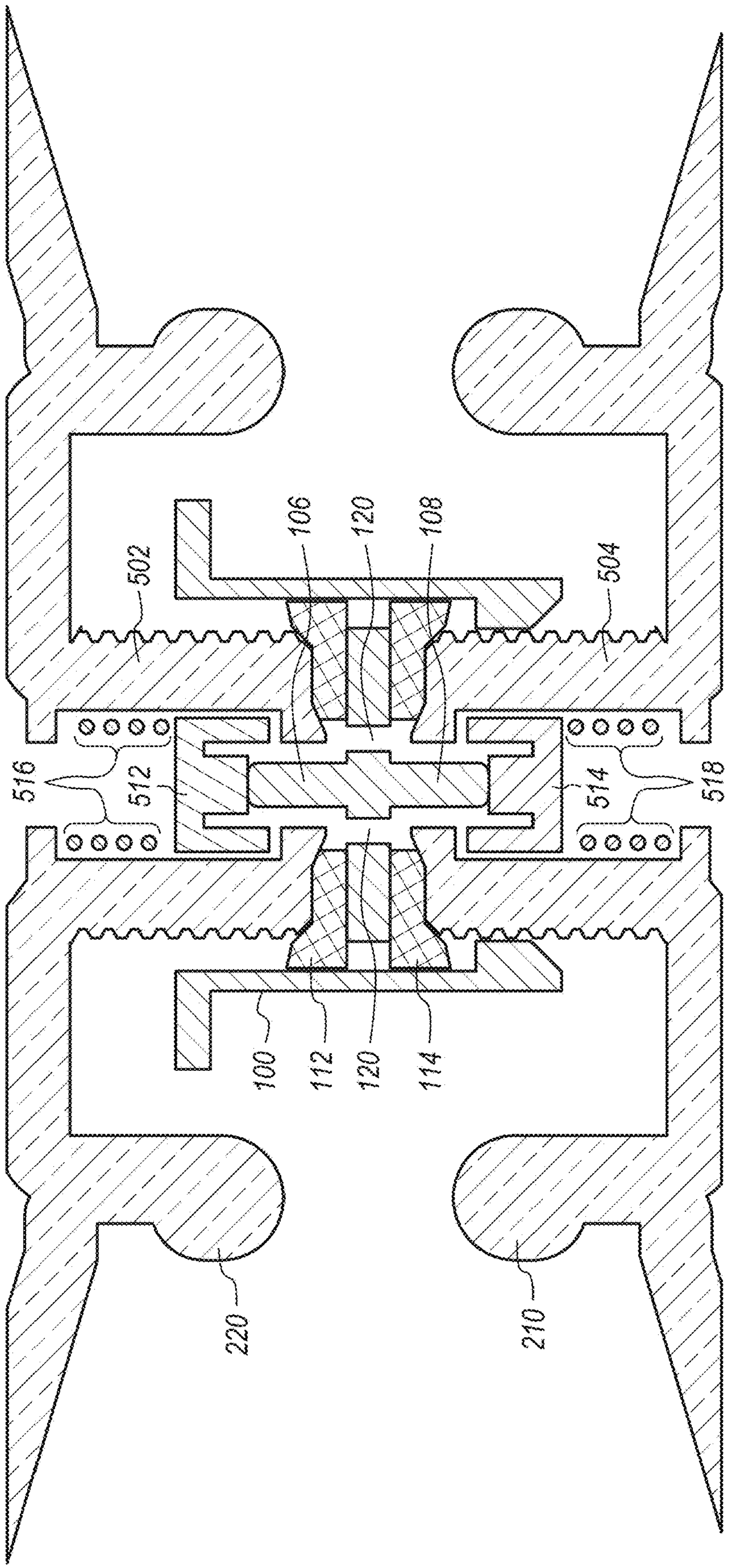
FIG. 5A illustrates a section view taken along line 232 of FIG. 2B.

FIG. 5A illustrates a section view of fluid transfer apparatus 100 taken along the line 332 of FIG. 3C. FIG. 5A also illustrates a section view of lower canister 210 and upper canister 220 taken along line 232 of FIG. 2B. The section view of lower canister 210 and upper canister 220 is simplified to demonstrate a context in which fluid transfer apparatus 100 may be used. In the example of FIG. 5A, the upper canister 220 comprises an upper canister valve 502, which comprises an upper canister plunger 512 and an upper canister spring 516. In an embodiment, the upper canister valve 502 may be inserted into the upper opening 130, causing the upper pin 106 to press against the upper canister plunger 512, compressing the upper canister spring 516 and opening the upper canister valve 502. In an embodiment, the upper canister valve 502 may also compress the upper gasket 112 against the center plate 310.

In an embodiment, the lower canister 210 comprises a lower canister valve 504, which comprises a lower canister plunger 514 and a lower canister spring 518. In an embodiment, the lower canister valve 504 may be inserted into the lower opening 140, causing the lower pin 108 to press against the lower canister plunger 514, compressing the lower canister spring 518 and opening the lower canister valve 504. In an embodiment, the lower canister valve 504 may also compress the lower gasket 114 against the center plate 310.

In an embodiment, when both the upper canister valve 502 and the lower canister valve 504 are open, a pathway or channel is formed through which fluid may flow from one canister to another. In an embodiment, fluid from the upper canister 220 may be directed to the lower canister 210 by gravity and/or by a pressure differential between the two canisters. In an embodiment, a canister storing more liquified petroleum gas than another canister of equal volume may have a higher pressure. In another embodiment, the pressure of a canister may also be increased by heating the canister or decreased by cooling the canister.

Figure 5B:
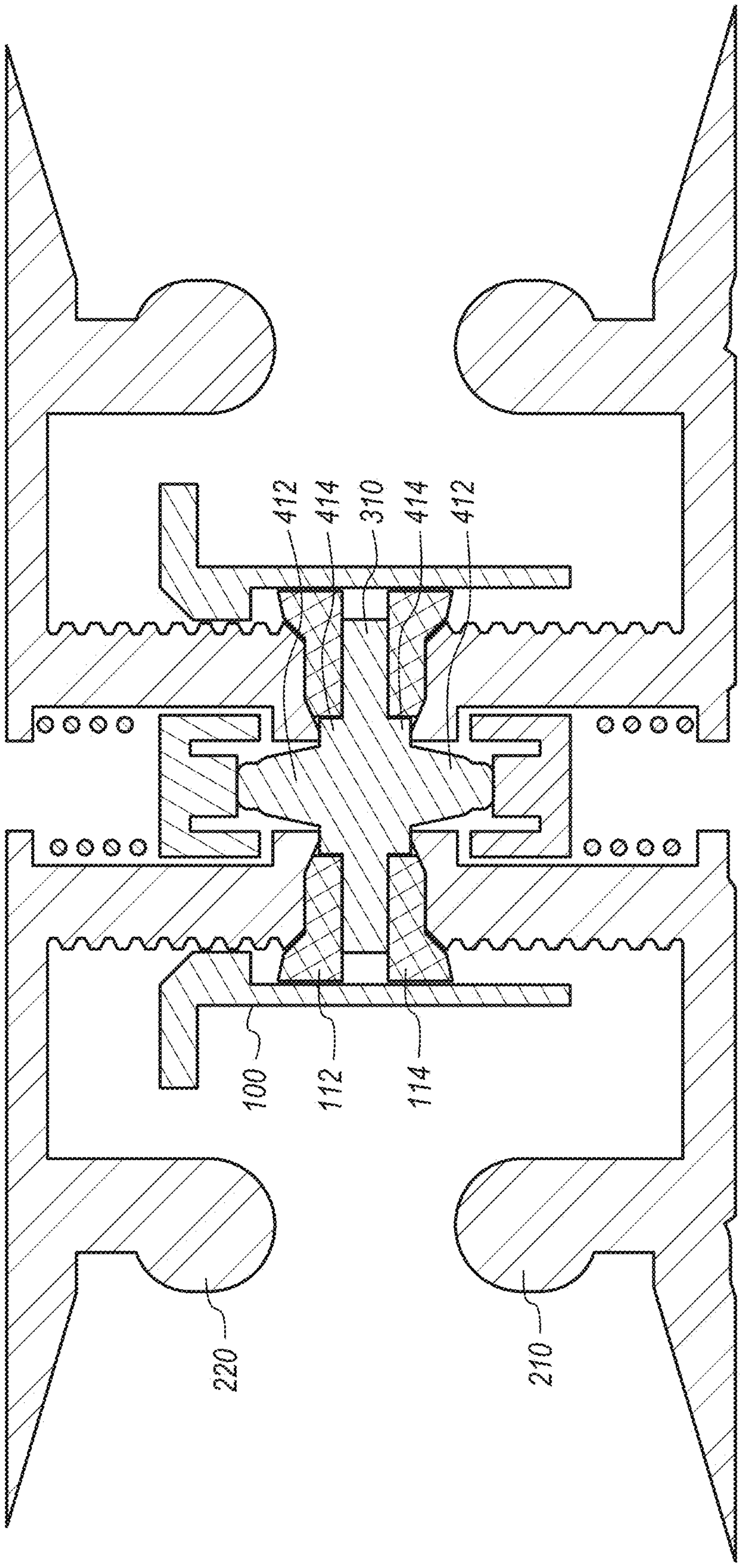
FIG. 5B illustrates a section view taken along line 232 of FIG. 2B.

FIG. 5B illustrates a section view taken along line 334. FIG. 5B also illustrates a section view of lower canister 210 and upper canister 220 taken along line 232 of FIG. 2B. The section view of lower canister 210 and upper canister 220 is simplified to demonstrate a context in which fluid transfer apparatus 100 may be used. In the example of FIG. 5B, the upper canister valve 502 is inserted into the upper opening 130, and the lower canister valve 204 is inserted into the lower opening 140. In an embodiment, the inner rib limiter portions 414 provide a depth stop for the upper canister 210 and the lower canister 220 as they are inserted into the fluid transfer apparatus 100. Limiting the depth of the canister valves may protect the upper gasket 112 and the lower gasket 114 and, in other embodiments, may maintain a larger channel through which fluid may be transferred between the canisters.

Figure 6:
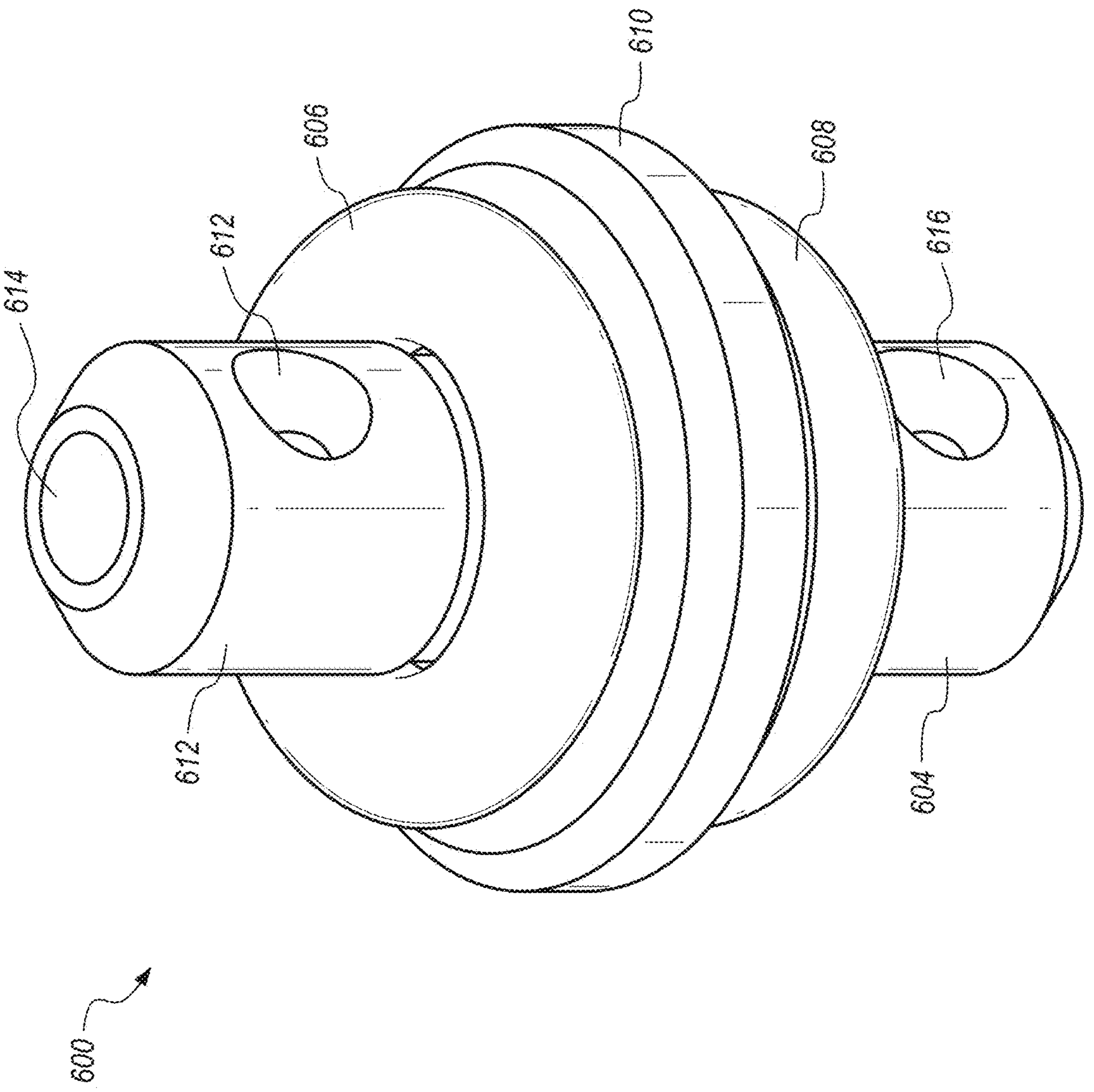
FIG. 6 illustrates a perspective view of a liquified gas transfer apparatus of another example embodiment.

FIG. 6 illustrates a perspective view of a liquified gas transfer apparatus in another embodiment. In the example of FIG. 6, a fluid transfer apparatus 600 may comprise an upper hollow pin 602 and an opposing lower hollow pin 604. The upper hollow pin 602 and the lower hollow pin 604 may each extend from opposing sides of a center plate 610. The upper hollow pin may have two upper side openings 612 and/or upper end opening 614. The two upper side openings 612 may be positioned on opposite sides of the upper hollow pin 602. In the example perspective of FIG. 6, only a single upper side opening 612 is visible. The lower hollow pin 604 may have two lower side openings 616 and/or a lower end opening 618, first shown in FIG. 7B. The two lower side openings 616 may be positioned on opposite sides of the lower hollow pin 604. In the example perspective of FIG. 6, only a single lower side opening 616 is visible.

In an embodiment, the ends of the upper hollow pin 602 and the lower hollow pin 604 may each have chamfered edges. The chamfered edges of the hollow pin ends may guide and center the upper and lower hollow pins 602 and 604 as they are inserted into valves of lower and upper canisters 210 and 220. In an embodiment, the upper and lower hollow pins 602 and 604 can depress plungers 512 and 514 of valves of lower and upper canisters 210 and 220 to open the valves of lower and upper canisters 210 and 220.

In an embodiment, the center plate 610, the upper hollow pin 602, and the lower hollow pin 604 may be integrally formed. In an embodiment, the fluid transfer apparatus 600 may be formed from injection molded non-reactive plastic or machined plastic, such as nylon or polycarbonate, or metal, such as brass or aluminum. In other embodiments, components of the fluid transfer apparatus 600 may be formed separately and coupled together with adhesive, welding, or screws.

In an embodiment, the fluid transfer apparatus 600 may comprise an upper O-ring 606 on upper hollow pin 602 and a lower O-ring 608 on lower hollow pin 604. The upper O-ring 606 and the lower O-ring 608 may each comprise a chemically resistant elastic material such as nitrile rubber or polyurethane. In another embodiment, upper O-ring 606 and the lower O-ring 608 may each comprise silicone, fluorosilicone, rubber, fluoro-rubber, Polytetrafluoroethylene (PTFE), neoprene, or polyvinyl chloride (PVC). In an embodiment, the upper O-ring 606 and the lower O-ring 608 may each have a toroidal shape. In other embodiments, the upper O-ring 606 and the lower O-ring 608 may each be a cylinder with a circular center opening.

Figure 7A:
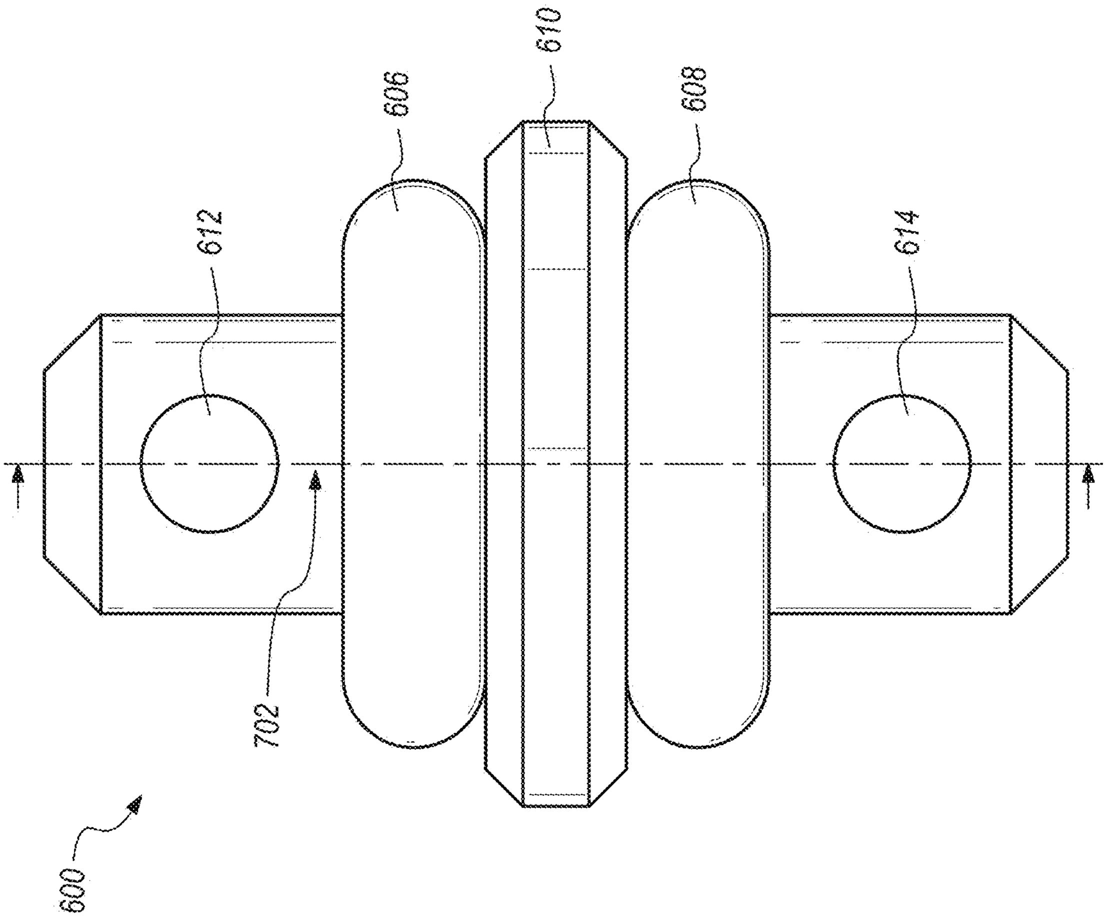
FIG. 7A illustrates a side elevation view of a liquified gas transfer apparatus of one example embodiment.

FIG. 7A illustrates a side elevation view of a liquified gas transfer apparatus in one embodiment. In the example of FIG. 7A, line 702 passes through a center axis of the fluid transfer apparatus 600. Line 702 may define a plane along which a cross-sectional view of the fluid transfer apparatus 600 may be taken. The plane may pass through the upper end opening 614, the lower end opening 616, the two upper side openings 616, and the two lower side openings 618.

Figure 7B:
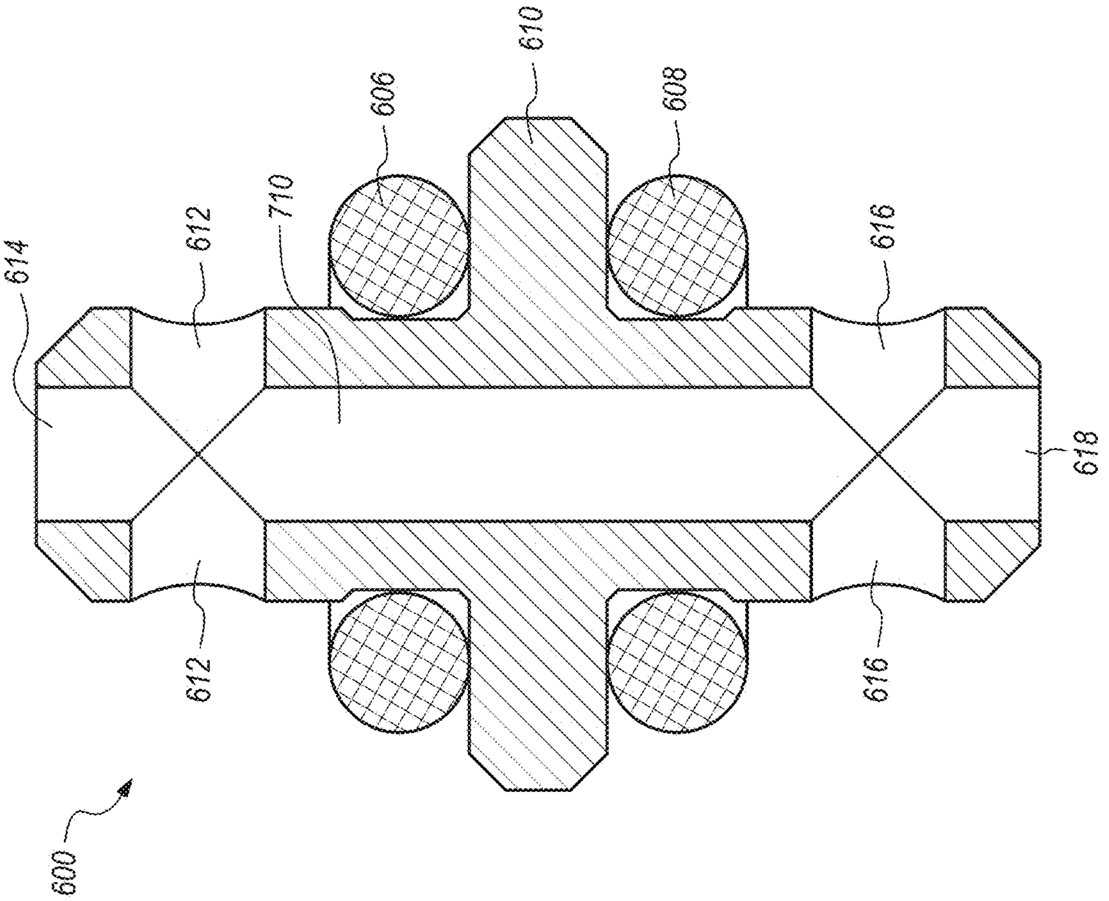
FIG. 7B illustrates a section view taken along line 702 of FIG. 7A.

FIG. 7B illustrates a section view taken along line 702 of FIG. 7A. In the example of FIG. 7B, channel 710 extends through the fluid transfer apparatus 600. Channel 710 may form a passageway connecting the upper end opening 614, the lower end opening 616, the two upper side openings 616, and the two lower side openings 618.

Figure 8A:
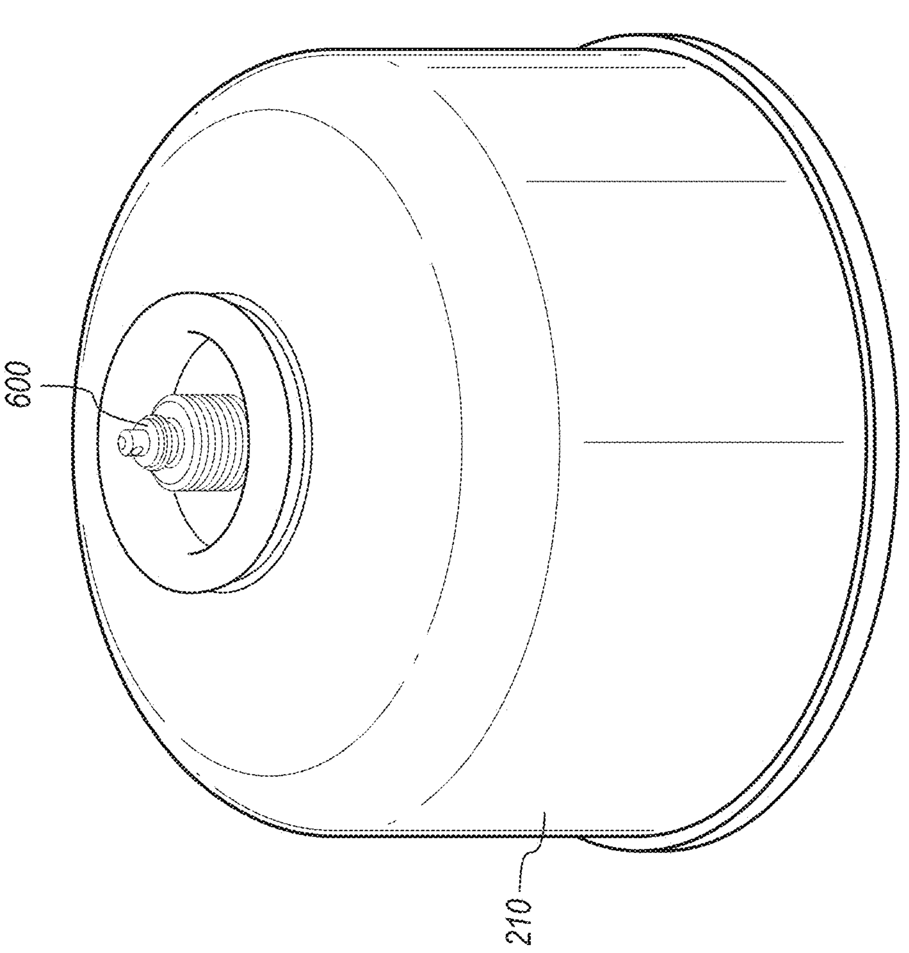
FIG. 8A illustrates a perspective view of a system in which a liquified gas transfer apparatus may be used in one example embodiment.

FIG. 8A illustrates a perspective view of a system in which a liquified gas transfer apparatus may be used in one embodiment. In the example of FIG. 8A, the fluid transfer apparatus 600 is coupled to the lower canister 210. In an embodiment, a single canister, such as lower canister 210, may be attached to the fluid transfer apparatus 600 for discharging the contents of the lower canister 210 into the atmosphere. In an embodiment, when pressure is applied to push the fluid transfer apparatus 600 against the lower canister plunger 514, the lower canister valve 504 may open and release stored fluids, such as liquified petroleum gases, within lower canister 210. The released fluids may be directed from the lower canister 210 and through channel 710.

Figure 8B:
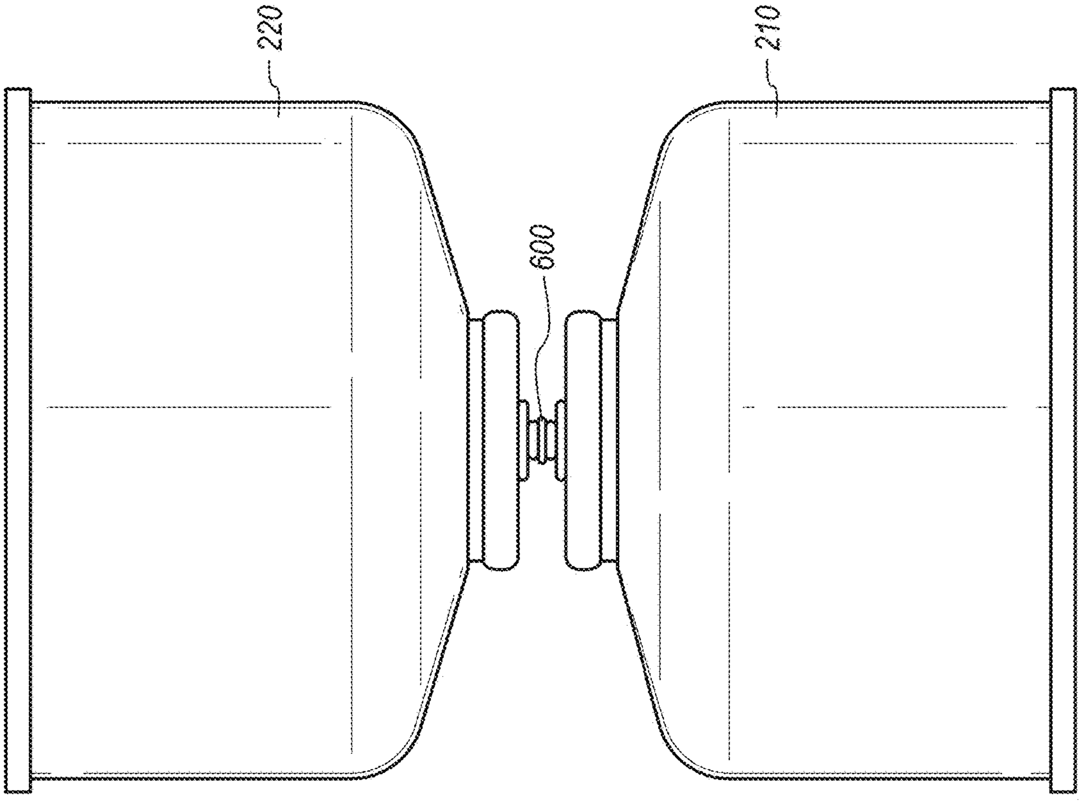
FIG. 8B illustrates a side elevation view of a system in which a liquified gas transfer apparatus may be used in one example embodiment.

FIG. 8B illustrates a side elevation view of a system in which a liquified gas transfer apparatus may be used in one embodiment. In the example of FIG. 8B, the fluid transfer apparatus 600 is coupled between the lower canister 210 and the upper canister 220. In an embodiment, the lower hollow pin 604 may be inserted into the lower canister valve 504, and the upper hollow pin 602 may be inserted into the upper canister valve 502. In an embodiment, when pressure is applied to push the fluid transfer apparatus 600 against the lower canister plunger 514 and the upper canister plunger 512, the upper and lower canister valves 502 and 504 may open and release stored fluid, such as liquified petroleum gas, from the upper canister 220 and/or the lower canister 210 into the fluid transfer apparatus 600. In an embodiment, the fluid may be directed by the fluid transfer apparatus 600 from the upper canister 220 and through upper side openings 612/and or upper end opening 614. The fluid may then be directed through channel 710, out lower side openings 616/and or lower end opening 618, and into the lower canister 210. The fluid may be directed, for example, due to gravitational force or to a pressure differential between canisters.

Figure 9A:
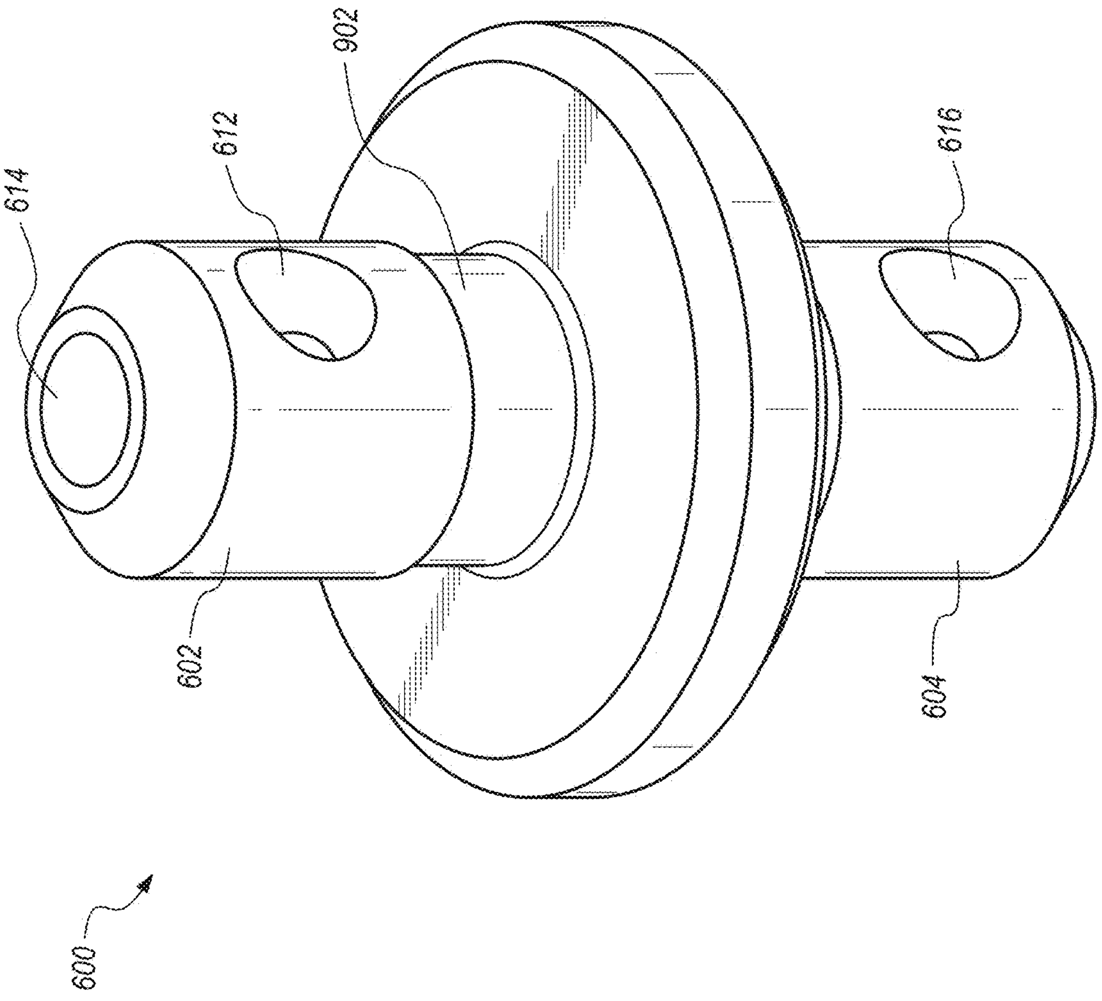
FIG. 9A illustrates a perspective view of a liquified gas transfer apparatus of one example embodiment.

FIG. 9A illustrates a perspective view of a liquified gas transfer apparatus in one embodiment. In the example of FIG. 9A, the upper O-ring 606 and the lower O-ring 608 are omitted. In an embodiment, the fluid transfer apparatus 600 may comprise an upper notch 902 on the upper hollow pin 602 and a lower notch 904 on the lower hollow pin 604. In an embodiment, the upper notch 902 and the lower notch 904 may each extend around the entire circumference of the upper hollow pin 602 and the lower hollow pin 604, respectively. In other embodiments, the notches 904 and 904 may each extend only partially around the circumferences of the upper hollow pin 602 and/or the lower hollow pin 604.

Figure 9B:
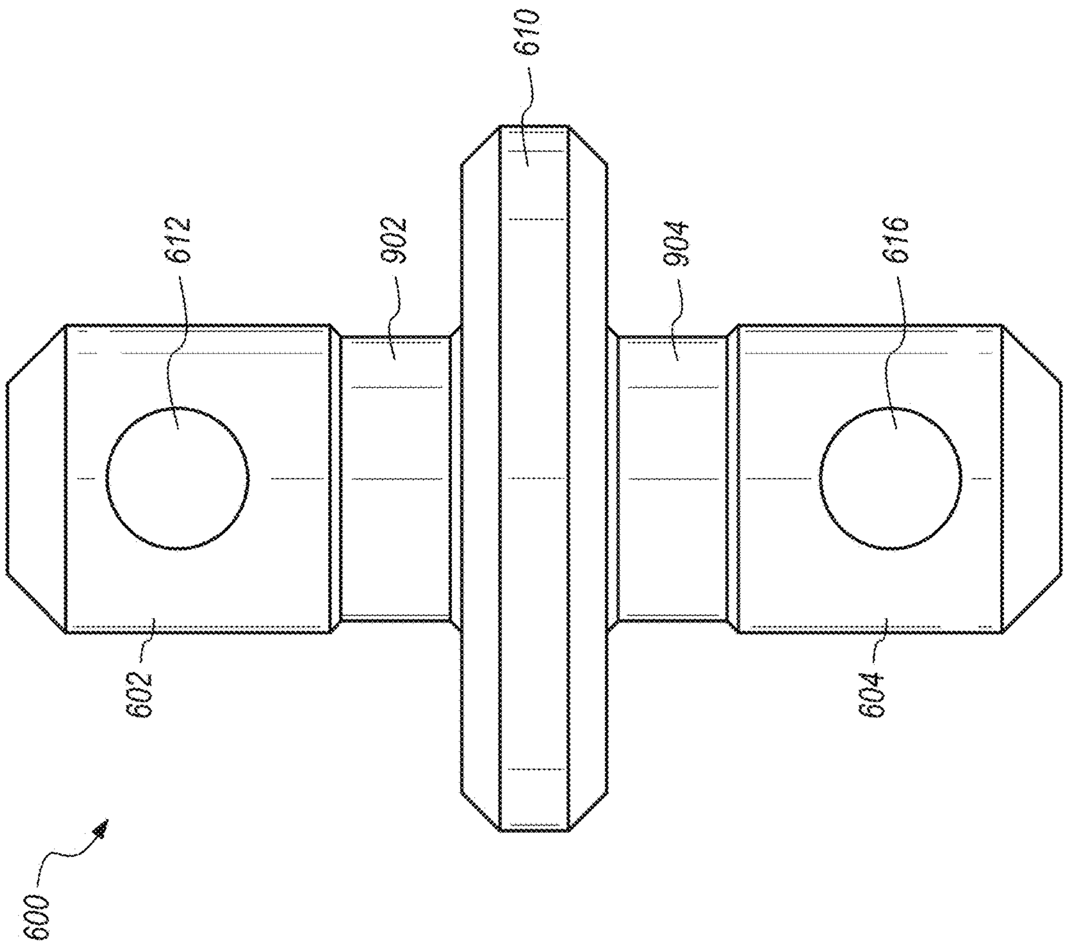
FIG. 9B illustrates a side elevation view of a liquified gas transfer apparatus of one example embodiment.

FIG. 9B illustrates a side elevation view of a liquified gas transfer apparatus in one embodiment. In the example of FIG. 9B, the upper O-ring 606 and the lower O-ring 608 are omitted. In an embodiment, the upper notch 902 and the lower notch 904 may be thinner segments of the upper hollow pin 602 and the lower hollow pin 604, respectively. The upper notch 902 and the lower notch 904 may hold the upper O-ring 606 and the lower O-ring 608 in place. In another embodiment, the upper notch 902 and/or the lower notch 904 may be omitted. In another embodiment, hold the upper O-ring 606, and the lower O-ring 608 may be coupled to the fluid transfer apparatus 600 with adhesive or with coupling elements such as screws. In other embodiments, the upper O-ring 606 and the lower O-ring 608 may be over-molded onto the fluid transfer apparatus 600.

Figure 10:
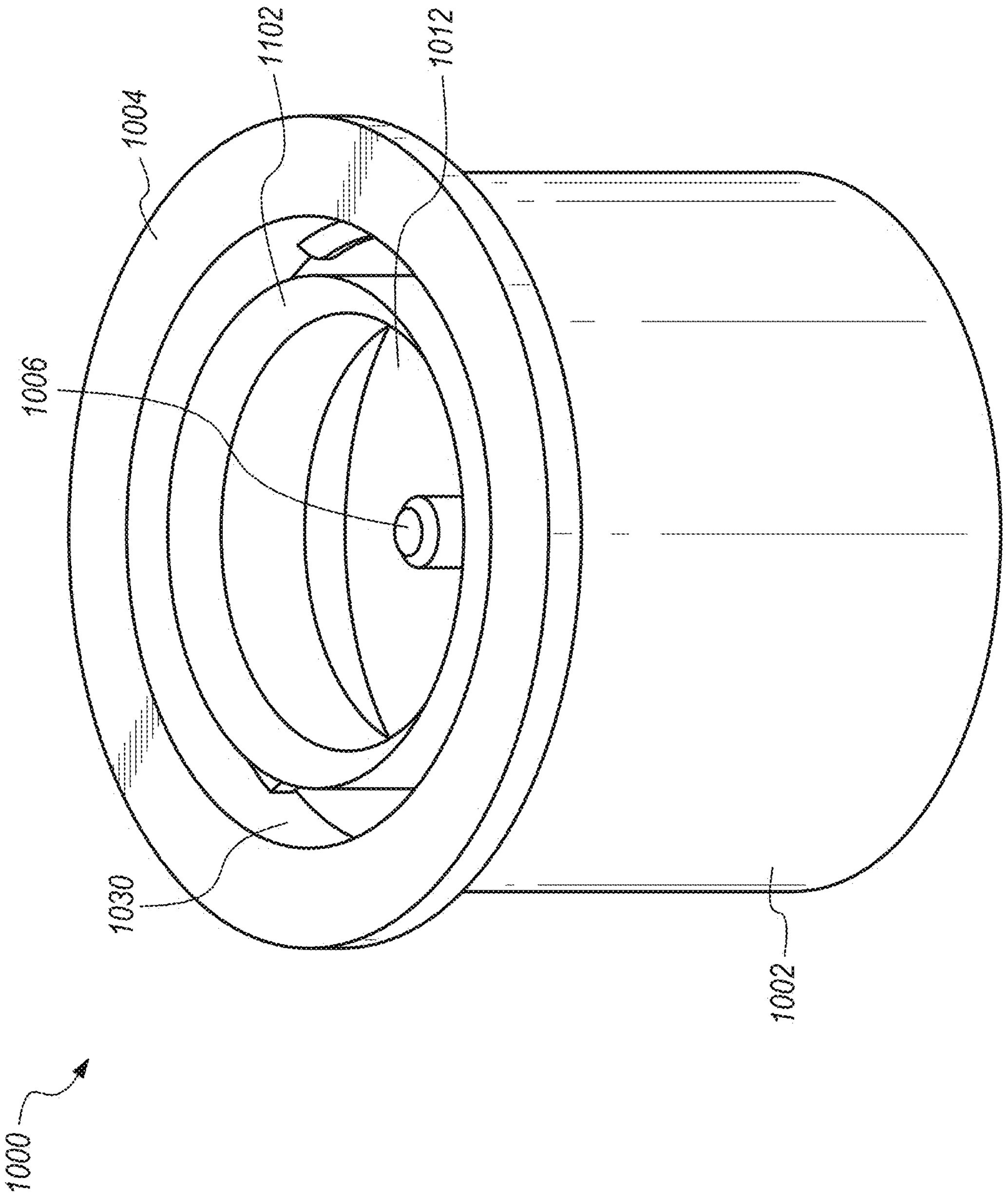
FIG. 10 illustrates a perspective view of a liquified gas transfer apparatus of one example embodiment.

FIG. 10 illustrates a perspective view of a liquified gas transfer apparatus of one example embodiment. In the example of FIG. 10, a fluid transfer apparatus 1000 has a housing 1002. In an embodiment, the housing may be a tubular hollow cylinder. In other embodiments, the housing may be other shapes, such as a polygonal prism. The housing may have an upper opening 1030. The housing may also have a lower opening 1040, shown first in FIG. 13B. In an embodiment, the upper opening 1030 and the lower opening 1040 each may be circular. In an embodiment, the upper opening 1030 and the lower opening 1040 may each have an opening diameter larger than that of an outer diameter of a B188 Lindal valve or a major diameter of threads of a B188 Lindal valve.

In an embodiment, a horizontal ring 1004 may surround the upper opening 1030 and is formed or molded integrally with housing 1002. The horizontal ring 1004 may provide a surface against which a user may apply pressure. In embodiments, a canister may be coupled to lower opening 1040, and pressure may be applied to fluid transfer apparatus 1000 to open a valve of the canister. This allows a user to empty the canister into the surrounding environment while minimizing contact with the expanding gas. In another embodiment, horizontal ring 1004 may be excluded. In another embodiment, housing 1002 may have a horizontal ring surrounding each of the upper opening 1030 and the lower opening 1040.

In an embodiment, the fluid transfer apparatus 1000 may include an upper pin 1006. The upper pin 1006 may depress the plunger of a canister. The fluid transfer apparatus may also include a lower pin 1008, shown first in FIG. 13B. The upper pin 1006 and the lower pin 1008 may each have a rounded or chamfered end. The rounded or chamfered ends may assist with directing and centering fluid transfer apparatus with a canister valve opening. The upper pin 1006 and the lower pin 1008 may each have a pin diameter smaller than an opening in a canister valve. In an embodiment, the pin diameter may be 1.8 millimeters (about 0.07087 inches). In another embodiment, the pin diameter may be between 1.6 and 2.0 millimeters (between about 0.06299 and 0.07874 inches), less than 1.6 millimeters (about 0.06299 inches), or more than 2.0 millimeters (about 0.07874 inches).

In an embodiment, the fluid transfer apparatus 1000 may include an upper gasket 1012. The upper gasket 1012 may comprise a gasket opening. The upper pin 1006 may extend through the gasket opening so that the upper pin 1006 is surrounded by the upper gasket 1012. The fluid transfer apparatus may also have a lower gasket 1014, first shown in FIG. 13B. The lower gasket may also comprise a gasket opening. The lower pin 1008 extends through the gasket opening so that the lower pin 1008 is surrounded by the lower gasket 1014.

Upper gasket 1012 and lower gasket 1014 may each comprise a chemically resistant nitrile rubber. In another embodiment, upper gasket 1012 and lower gasket 1014 may each comprise a material such as silicone, fluorosilicone, rubber, fluoro-rubber, Polytetrafluoroethylene (PTFE), neoprene, or polyvinyl chloride (PVC). In an embodiment, upper gasket 1012 and lower gasket 114 may each comprise a closed-cell foam or a closed-cell rubber. In an embodiment, upper gasket 112 and lower gasket 114 may each be 0.125 inches thick (about 3.175 millimeters). In another embodiment, upper gasket 1012 and lower gasket 1014 may each have a thickness of less than 0.125 inches or more than 0.125 inches.

Figure 12:
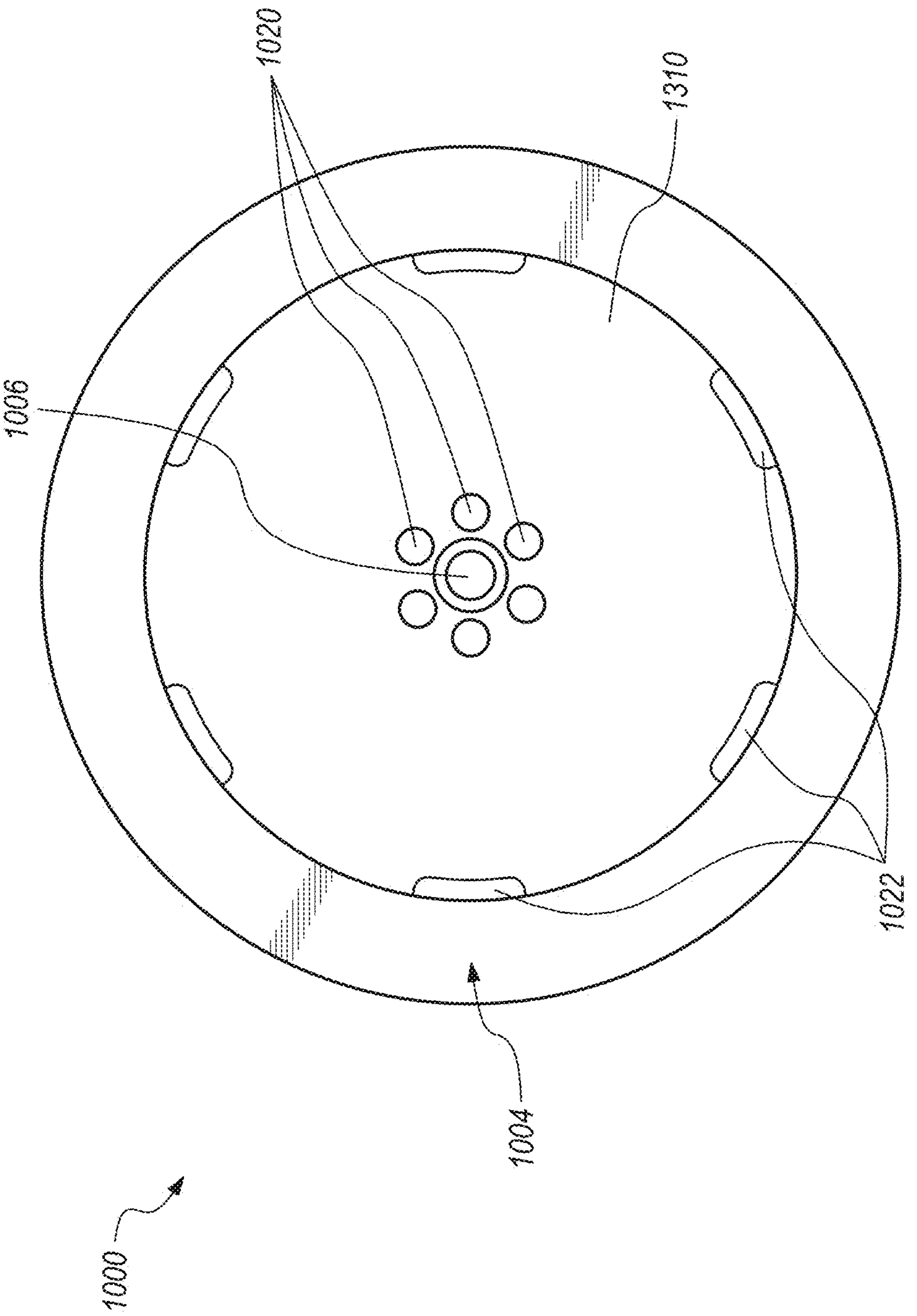
FIG. 12 illustrates a top plan view of a liquified gas transfer apparatus of one example embodiment.

In an embodiment, the upper pin 1006 and the lower pin 1008 may each extend from a center plate 1310, first shown in FIG. 12. The upper pin 1006, the lower pin 1008, and the center plate 1310 may formed or molded integrally with housing 1002. In an embodiment, each of the upper pin 1006 and the lower pin 1008 may have a height that is selected based on the hardness or elasticity modulus of a material used for upper gasket 1012 and lower gasket 1014. A softer material or a material with a higher elasticity modulus may require more compression before forming a seal for fluid transfer. To allow for greater compression, a shorter pin height may be used. In an embodiment, the upper pin 106 and the lower pin 108 may each extend 3.7 millimeters (about 0.145669 inches) in height from center plate 310. In another embodiment, each pin may have a height between 3.7 and 3.8 millimeters (between about 0.145669 and 0.149606 inches), less than 3.7 millimeters (about 0.149606 inches), or more than 3.8 millimeters (about 0.149606 inches).

In an embodiment, the fluid transfer apparatus 1000 may include an upper retaining ring 1102. The upper retaining ring 1102 may hold the upper gasket 1012 in place against the center plate 1310. The fluid transfer apparatus may also have a lower retaining ring 1104, first shown in FIG. 13B. The lower retaining ring 1104 may hold the lower gasket 1014 in place against the center plate 1310. The upper retaining ring 1102 and the lower retaining ring 1104 may be formed separately from the housing 1002 and may be removable from the housing 1002. The upper retaining ring 1102 and the lower retaining ring 1104 may be formed from a rigid plastic or a flexible plastic that may be press-fit inside housing 1002. In an embodiment, the upper retaining ring 1102 and the lower retaining ring 1104 may be held in place by teeth on housing 1002 or may be held in place by other coupling components such as threads, screws, or magnets.

Figure 11:
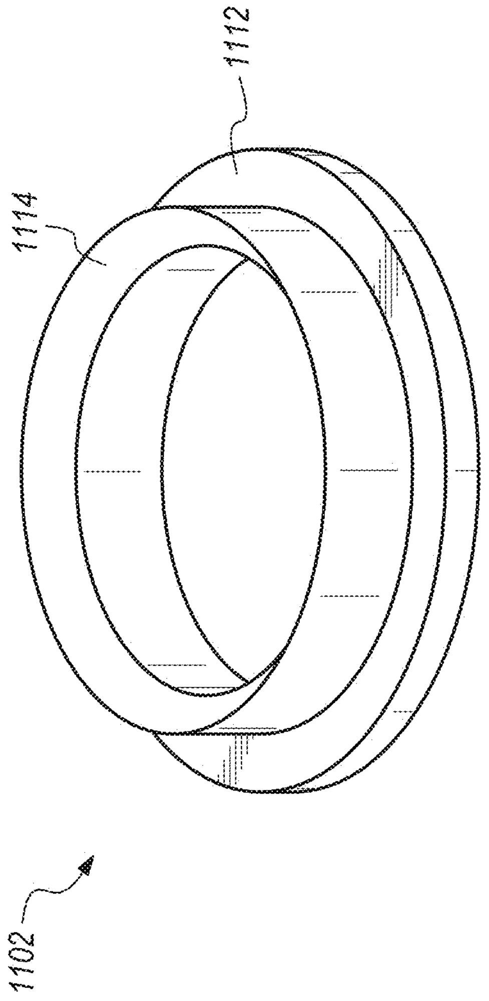
FIG. 11 illustrates a perspective view of a retaining ring of one example embodiment.

FIG. 11 illustrates a perspective view of a retaining ring of one example embodiment. In an embodiment, the upper retaining ring 1102 and the lower retaining ring 1104 may each have a first end with a peripheral ring 1112 and a second end with an angled opening 1104. The peripheral ring 1112 may face a gasket in housing 1002 and may provide a first flat, even surface area around the inner periphery of housing 1002 to hold the gasket in place. The peripheral ring 1112 may provide a second flat, even surface area facing away from the gasket for teeth or other coupling features to press against to hold the retaining ring in place.

In an embodiment, the angled opening 1114 may have a diameter larger than that of an outer diameter of a B188 Lindal valve and may direct and center fluid transfer apparatus 1000 when it is coupled to a canister valve opening. The angled opening 1114 may be inwardly or downwardly angled or inclined, for example, at a 45° angle. In other embodiments, the angled opening 1114 may be inclined at an angle between 30° and 60°, less than 30°, or greater than 60°. In other embodiments, the opening may have a rounded edge or a chamfered edge.

FIG. 12 illustrates a top plan view of a liquified gas transfer apparatus of one example embodiment. In the example of FIG. 12, the upper gasket 1012 and the upper retaining ring 1102 are omitted. In an embodiment, the fluid transfer apparatus 1000 comprises a plurality of holes 1020 surrounding the upper pin 1006. The plurality of holes 1020 may extend entirely through a center plate 1310 to form passages through the center plate 1310. The plurality of holes 1020 may provide channels so that liquified petroleum gases may be directed through the fluid transfer apparatus 1000. In an embodiment, each hole in the plurality of holes may be circular. In other embodiments, the holes may have other shapes, such as a triangle or a sector of a circle centered on upper pin 1006.

In an embodiment, the fluid transfer apparatus 1000 may include a plurality of upper teeth 1022 formed integrally with and extending inwardly from housing 1002 and above the upper gasket 1012. The plurality of upper teeth 1022 may be distributed around a perimeter of the upper opening 1030 inside housing 1002. The fluid transfer apparatus 1000 may also include a plurality of lower teeth 1024, first shown in FIG. 13C. The plurality of lower teeth 1024 may be distributed around a perimeter of the lower opening 1040 inside housing 1002. In an embodiment, the plurality of upper teeth 1022 and the plurality of lower teeth 1024 may hold the upper retaining ring 1102 and the lower retaining ring 1104, respectively, within housing 1002.

Figure 13A:
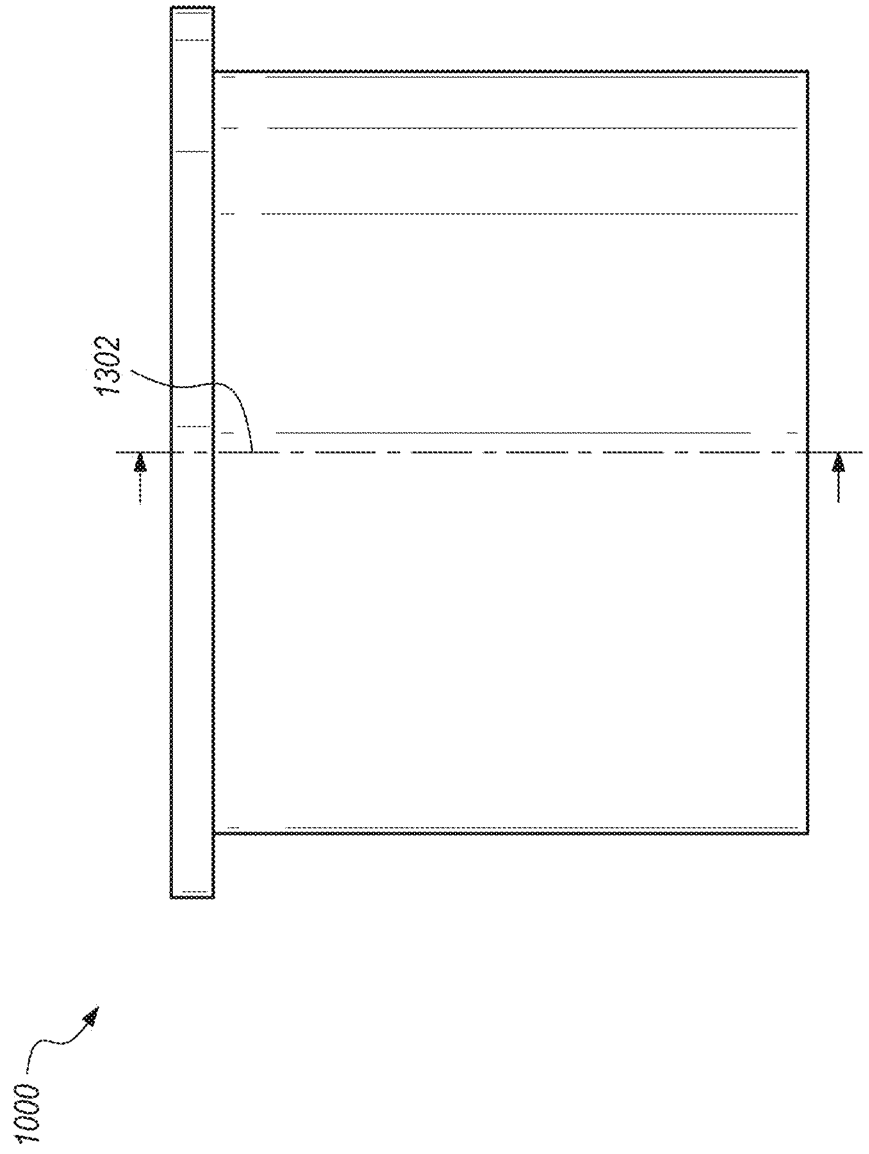
FIG. 13A illustrates a side elevation view of a liquified gas transfer apparatus of one example embodiment.

FIG. 13A illustrates a side elevation view of a liquified gas transfer apparatus of one example embodiment. In the example of FIG. 13A, a section view diameter line 1302 extends across the fluid transfer apparatus 1000. The section view diameter line 1302 may represent a plane along which a cross-section of the fluid transfer apparatus may be viewed. In an embodiment, the section view diameter line 1302 extends through two holes in the plurality of holes 120, the center plate 310, the upper pin 106, the lower pin 108, the upper gasket 112 and lower gasket 114 and two of the upper teeth 1022, shown in FIG. 13A and FIG. 13B.

In the example of FIG. 13A, a section view diameter line 1302 extends across the fluid transfer apparatus 1000. The section view diameter line 1302 may represent a plane along which a cross-section of the fluid transfer apparatus may be viewed.

Figure 13B:
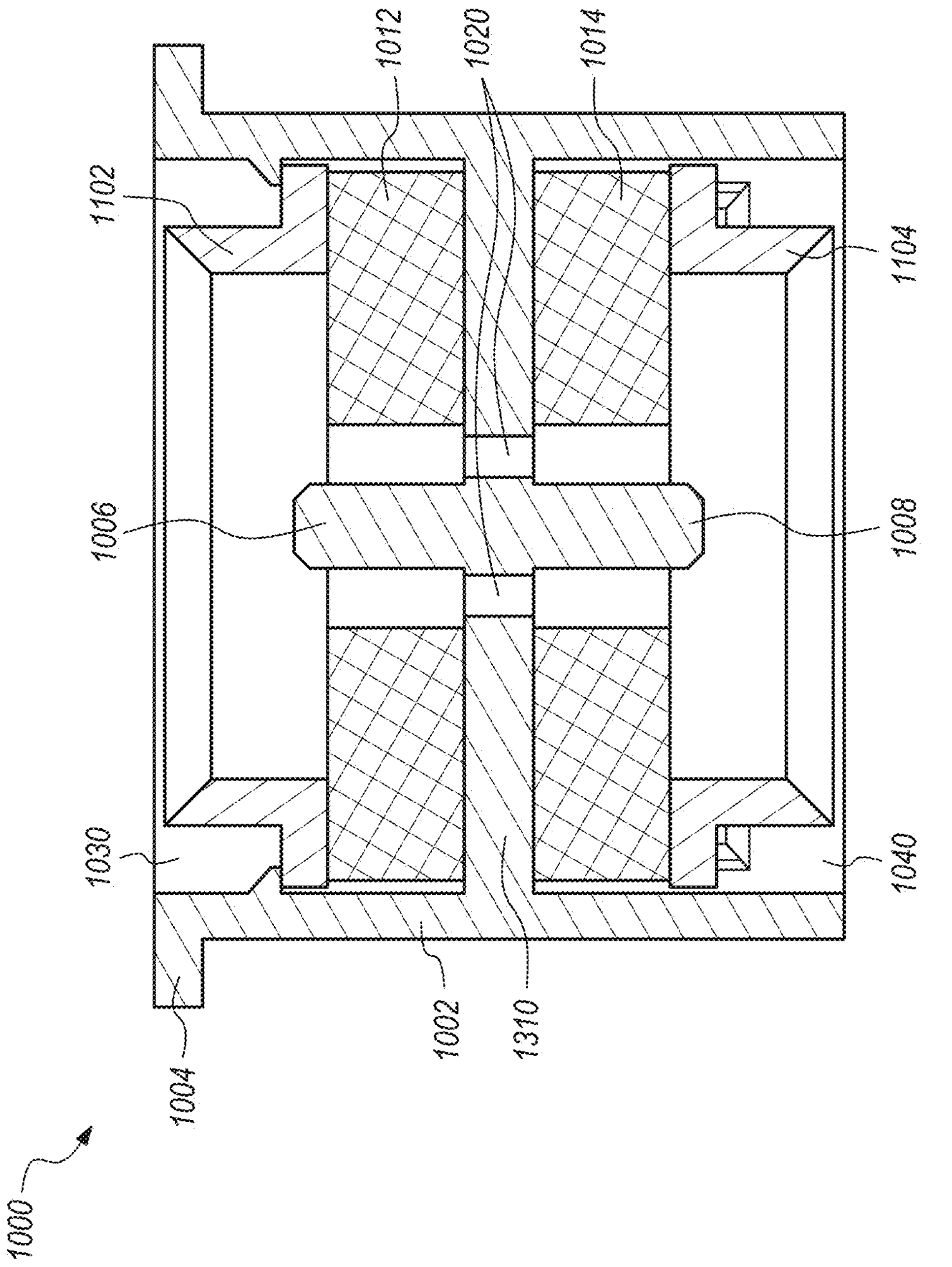
FIG. 13B illustrates a section view taken along line 1302 of FIG. 13A.

FIG. 13B illustrates a section view taken along line 1302 of FIG. 13A. In the example of FIG. 13B, the peripheral ring of the upper retaining ring 1102 is interposed between the upper teeth 1022 and the upper gasket 1012. Similarly, the peripheral ring of the lower retaining ring 1104 is interposed between the lower teeth 1024 and the lower gasket 1014.

In an embodiment, the upper gasket 1012 and the lower gasket 1014 may each be cylindrical, with a circular opening through the center axis of the gasket. The circular openings through the upper gasket 1012 and lower gasket 1014 may overlap each other and the plurality of holes 1020. When fluid passes through the fluid transfer apparatus 1000, the upper gasket 1012 and lower gasket 1014 may prevent fluid from leaking into the outside environment as the fluid flows or is directed from a canister coupled to the upper opening 1030 to another canister coupled to the lower opening 1040. In other embodiments, the upper gasket 1012 and the lower gasket 1014 may each be toroidal; for example, the upper gasket 1012 and the lower gasket 1014 may be O-rings. In an embodiment, the upper gasket 1012 and the lower gasket 1014 may each be compressible. In an embodiment, the upper gasket 1012 and the lower gasket 1014 may each conform to the shape of the fluid transfer apparatus 1000 and/or to the shape of canister valves coupled to the fluid transfer apparatus 1000.

In another embodiment, any one of, multiple of, or all of, the upper teeth 1022, the lower teeth 1024, the upper retaining ring 1102, and the lower retaining ring 1104 are omitted and other means can be used to hold the upper gasket 1012 and the lower gasket 1014 in place. In an embodiment, the upper gasket 1012 and the lower gasket 1014 may be coupled to the fluid transfer apparatus 1000 with adhesive or with coupling elements such as screws. In other embodiments, the upper gasket 1012 and the lower gasket 1014 may be over-molded onto the fluid transfer apparatus 1000.

Figure 13C:
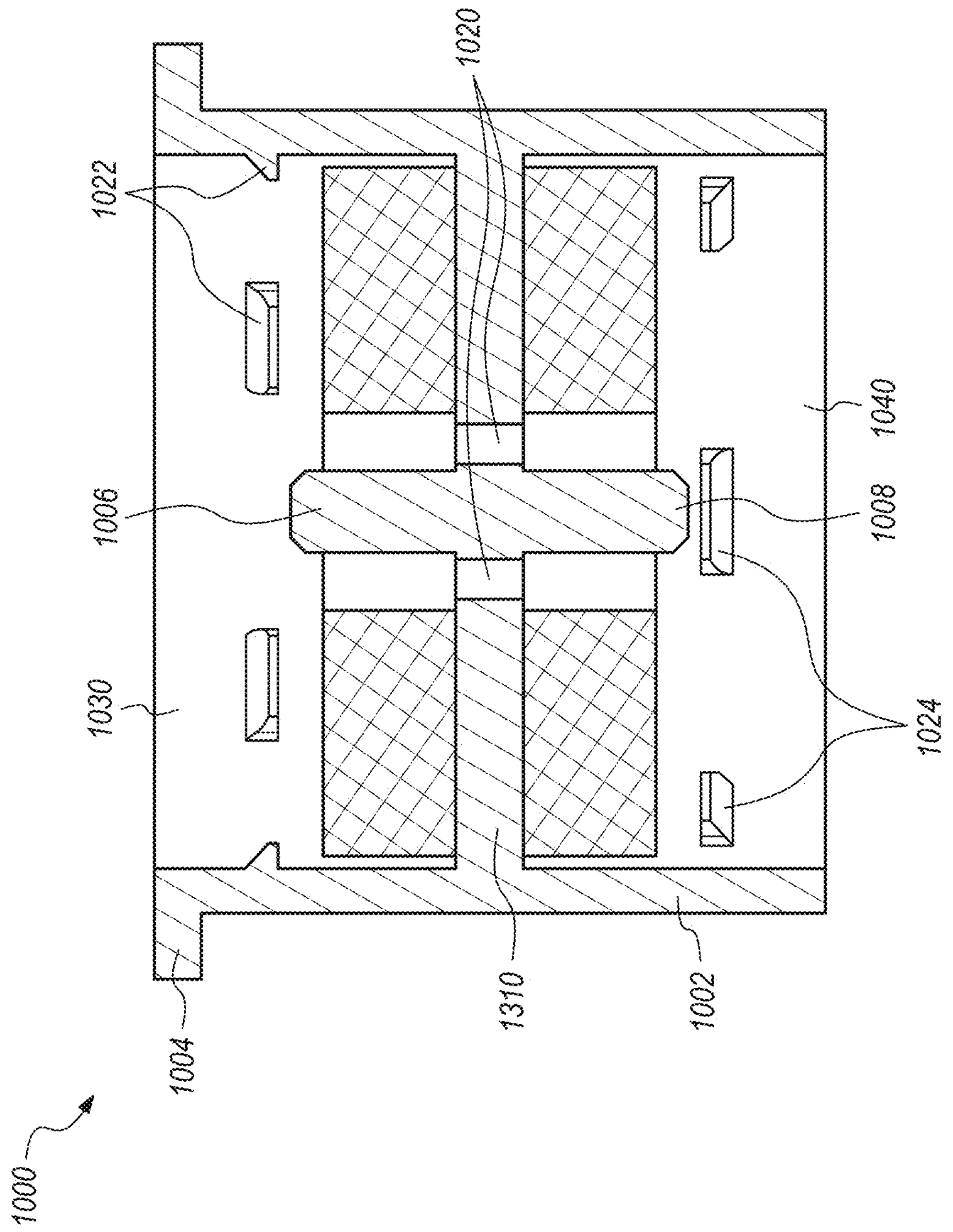
FIG. 13C illustrates a section view taken along line 1202 of FIG. 13A.

FIG. 13C illustrates a section view taken along line 1302 of FIG. 13A. In the example of FIG. 13B, the upper retaining ring 1102 and the lower retaining ring 1104 are omitted. In an embodiment, the upper teeth 1022 and the lower teeth 1024 each extend around the inner periphery of the housing 1002.

Figure 14:
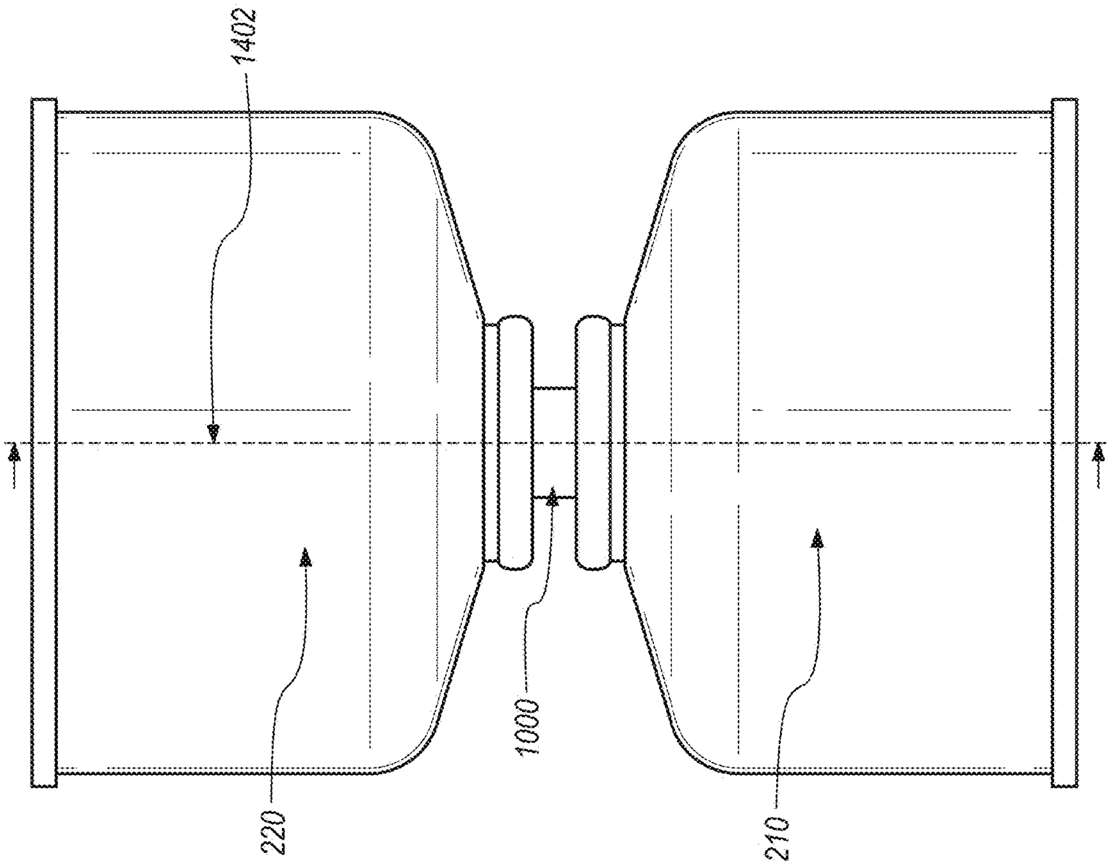
FIG. 14 illustrates a side elevation view of a system in which a liquified gas transfer apparatus may be used in one example embodiment.

FIG. 14 illustrates a side elevation view of a system in which a liquified gas transfer apparatus may be used in one example embodiment. In the example of FIG. 14, a valve of the lower canister 210 has been inserted into the lower opening 140 of the fluid transfer apparatus 1000 and a valve of an upper canister 220 has been inserted into the upper opening 130 of the fluid transfer apparatus 1000. In an embodiment, the upper canister 220 and the lower canister 210 may each store liquefied petroleum gas, such as butane, isobutane, propane, a mixture of those, other fuels, or other liquids or liquefied gases. When force is applied to push the upper canister 220 and the lower canister 210 together towards the fluid transfer apparatus 1000, the fluid transfer apparatus 1000 may open the valves of the upper canister 220 and the lower canister 210 to direct a fluid stored in the upper canister 220 and the lower canister 210 from one canister to another canister through the plurality of holes 120, for example, due to gravitational force or to a pressure differential between canisters. In the example of FIG. 14, a section view diameter line 1402 extends across the fluid transfer apparatus 1000, lower canister 210, and upper canister 220. The section view diameter line 1402 may represent a plane along which a cross-section of the fluid transfer apparatus may be viewed.

Figure 15:
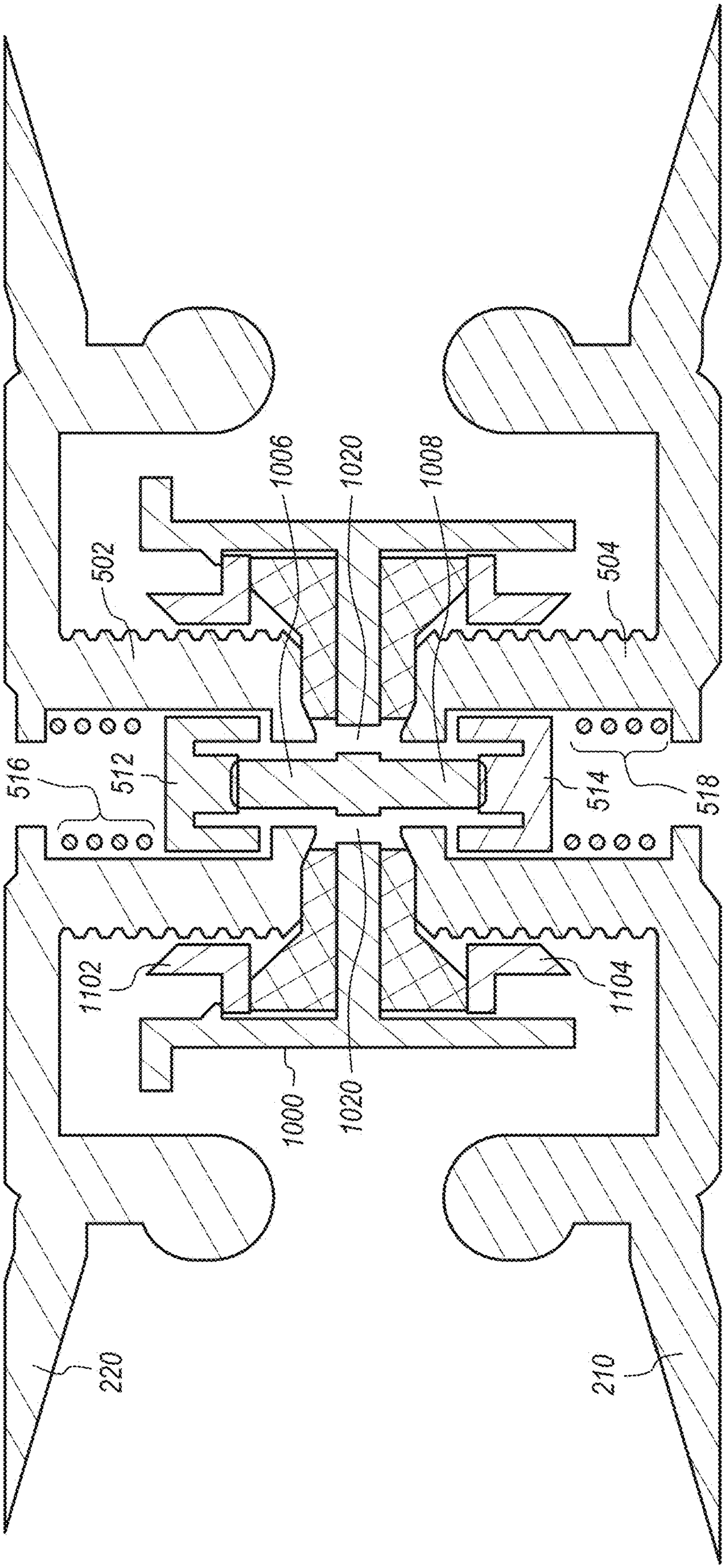
FIG. 15 illustrates a section view taken along line 1202 of FIG. 12

FIG. 15 illustrates a section view taken along line 1202 of FIG. 12. The section view of lower canister 210 and upper canister 220 is simplified to demonstrate a context in which fluid transfer apparatus 1000 may be used. In the example of FIG. 15, the upper canister 220 comprises an upper canister valve 502, which comprises an upper canister plunger 512 and an upper canister spring 516. In an embodiment, the upper canister valve 502 may be inserted into the upper opening 1030, causing the upper pin 1006 to press against the upper canister plunger 512, compressing the upper canister spring 516 and opening the upper canister valve 502. In an embodiment, the upper canister valve 502 may also compress the upper gasket 1012 against the center plate 1310.

In an embodiment, the lower canister 210 comprises a lower canister valve 504, which comprises a lower canister plunger 514 and a lower canister spring 518. In an embodiment, the lower canister valve 504 may be inserted into the lower opening 1040, causing the lower pin 1008 to press against the lower canister plunger 514, compressing the lower canister spring 518 and opening the lower canister valve 504. In an embodiment, the lower canister valve 504 may also compress the lower gasket 1014 against the center plate 1310.

In an embodiment, when both the upper canister valve 502 and the lower canister valve 504 are open, a pathway or channel is formed through which fluid may flow from one canister to another. In an embodiment, fluid from the upper canister 220 may be directed to the lower canister 210 by gravity and/or by a pressure differential between the two canisters. In an embodiment, a canister storing more liquified petroleum gas than another canister of equal volume may have a higher pressure. In another embodiment, the pressure of a canister may also be increased by heating the canister or decreased by cooling the canister.

3. Benefits, Improvements, and Scope

The embodiments described above and shown in the drawing views provide a lightweight fuel transfer apparatus that may be easier to clear of debris and less likely to cause cross-threading problems than in prior practice. Unlike previously offered devices, the embodiments described above do not require a complex valve with moving parts to transfer fluid from one vessel to another. Also unlike previously offered devices, the embodiments described above provide outer ribs that are capable of serving dual purposes of guiding a canister valve into position and holding a gasket in place. Similarly, the embodiments described above provide inner ribs that may serve dual purposes of guiding a canister valve into position and limiting compression of a gasket. The embodiments described above allow for easy access to channels through which fluid is directed so that any debris accumulation can be easily removed. Additional improvements include vertical housing walls that may direct any butane that leaks or is released at the end of the transfer into the cup of the butane canisters instead of radially towards the user.

The above-disclosed subject matter is to be considered illustrative and not restrictive, and the appended claims are intended to cover all such modifications, enhancements, and other embodiments that fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

I claim:

1. An apparatus for transferring fluids, the apparatus comprising:

a housing having first and second opposing openings;

a plate extending across the housing, wherein the plate has a first plate surface facing the first opening and a second plate surface facing the second opening;

a first pin coupled to the first plate surface and extending from the first plate surface towards the first opening;

a second pin coupled to the second plate surface and extending from the second plate surface towards the second opening;

a channel through the plate configured to allow a fluid to pass from the first opening to the second opening;

wherein the channel is between the housing and the first and second pins and wherein the first and second pins are solid; and a first gasket interposed between the first plate surface and the first opening, wherein the first gasket comprises a first gasket opening surrounding the first pin.

2. The apparatus of claim 1, wherein the housing is cylindrical and extends along a center axis, wherein the plate comprises a horizontal disk in a plane perpendicular to the center axis, and wherein the first and second pins extend along the center axis.

3. The apparatus of claim 2, wherein the first opening has a first diameter that is larger than a major diameter of a Lindal B188 valve thread.

4. The apparatus of claim 1, wherein the first pin is configured to depress a plunger of a valve on a canister, wherein depressing the plunger allows the fluid to flow from the canister through the first opening and through the channel.

5. The apparatus of claim 4, further comprising a plurality of inner ribs, each having a horizontally extending portion along the first plate surface, wherein the horizontally extending portion of each of the plurality of inner ribs is configured to limit a depth of insertion of the valve of the canister into the housing.

6. The apparatus of claim 1, further comprising a plurality of outer ribs coupled to the housing, each of the plurality of outer ribs having a first end facing the first opening and a second end facing the plate, wherein the first end comprises an inclined surface configured to direct and center a valve inserted into the housing.

7. The apparatus of claim 1, further comprising a removable ring configured to hold the first gasket in place.

8. The apparatus of claim 1, wherein the channel is one channel of a plurality of channels distributed radially around the first and second pins.

9. An apparatus for transferring fluids, the apparatus comprising:

a housing having first and second opposing openings;

a plate extending across the housing, wherein the plate has a first plate surface facing the first opening and a second plate surface facing the second opening;

a first pin coupled to the first plate surface and extending from the first plate surface towards the first opening;

a second pin coupled to the second plate surface and extending from the second plate surface towards the second opening;

a channel through the plate configured to allow a fluid to pass from the first opening to the second opening;

a first gasket interposed between the first plate surface and the first opening; and a second gasket interposed between the second plate surface and the second opening;

wherein the channel is configured to allow the fluid to pass from a first space between the first gasket and the first pin to a second space between the second gasket and the second pin.

10. The apparatus of claim 9, wherein the housing is cylindrical and extends along a center axis, wherein the plate comprises a horizontal disk in a plane perpendicular to the center axis, and wherein the first and second pins extend along the center axis.

11. The apparatus of claim 10, wherein the first opening has a first diameter that is larger than a major diameter of a Lindal B188 valve thread.

12. The apparatus of claim 9, wherein the first pin is configured to depress a plunger of a valve on a canister, wherein depressing the plunger allows the fluid to flow from the canister through the first opening and through the channel.

13. The apparatus of claim 12, further comprising a removable ring configured to hold the first gasket in place, the removable ring having a first end facing the first opening and a second end facing the plate, wherein the first end comprises an inclined surface configured to direct and center a valve inserted into the housing.

14. The apparatus of claim 13, wherein the second end comprises a surface parallel to the plate and wherein the second end is configured to hold the first gasket in place.

15. The apparatus of claim 9, wherein the channel is one channel of a plurality of channels distributed radially around the first and second pins.

16. An apparatus for transferring fluids, comprising:

a housing having first and second opposing openings;

a plate extending across the housing, wherein the plate has a first plate surface facing the first opening and a second plate surface facing the second opening;

a first pin coupled to the first plate surface and extending from the first plate surface towards the first opening;

a second pin coupled to the second plate surface and extending from the second plate surface towards the second opening;

a channel through the plate configured to allow a fluid to pass from the first opening to the second opening;

a removable ring having a first end facing the first opening and a second end facing the plate; and a first gasket interposed between the first plate surface and the first opening, wherein the first gasket comprises a first center gasket opening surrounding the first pin.

17. The apparatus of claim 16, wherein the housing is cylindrical and extends along a center axis, wherein the plate comprises a horizontal disk in a plane perpendicular to the center axis, and wherein the first and second pins extend along the center axis.

18. The apparatus of claim 16, wherein the first opening has a first diameter that is larger than a major diameter of a Lindal B188 valve thread.

19. The apparatus of claim 16, wherein the first pin is configured to depress a plunger of a valve on a canister, wherein depressing the plunger allows the fluid to flow from the canister through the first opening and through the channel.

20. The apparatus of claim 16, wherein the first end comprises an inclined surface configured to direct and center a valve inserted into the housing.

21. The apparatus of claim 20, wherein the second end comprises a surface parallel to the plate and wherein the second end is configured to hold the first gasket in place.

22. The apparatus of claim 16, wherein the channel is one channel of a plurality of channels distributed radially around the first and second pins.

* * * * *